(12) United States Patent
Ishizaki

(10) Patent No.: US 9,454,317 B2
(45) Date of Patent: Sep. 27, 2016

(54) TIERED STORAGE SYSTEM, STORAGE CONTROLLER AND METHOD OF SUBSTITUTING DATA TRANSFER BETWEEN TIERS

(71) Applicants: KABUSHIKI KAISHA TOSHIBA, Tokyo (JP); TOSHIBA SOLUTIONS CORPORATION, Kawasaki-shi, Kanagawa (JP)

(72) Inventor: Kouta Ishizaki, Kodaira Tokyo (JP)

(73) Assignees: Kabushiki Kaisha Toshiba, Tokyo (JP); Toshiba Solutions Corporation, Kanagawa (JP)

(*) Notice: Subject to any disclaimer, the term of this patent is extended or adjusted under 35 U.S.C. 154(b) by 105 days.

(21) Appl. No.: 14/476,108

(22) Filed: Sep. 3, 2014

(65) Prior Publication Data

US 2015/0220280 A1    Aug. 6, 2015

Related U.S. Application Data

(63) Continuation of application No. PCT/JP2014/052309, filed on Jan. 31, 2014.

(51) Int. Cl.
*G06F 12/00* (2006.01)
*G06F 3/06* (2006.01)
*G06F 12/08* (2016.01)

(52) U.S. Cl.
CPC .......... *G06F 3/0619* (2013.01); *G06F 3/0665* (2013.01); *G06F 3/0689* (2013.01); *G06F 12/0848* (2013.01); *G06F 12/0868* (2013.01); *G06F 12/0888* (2013.01); *G06F 12/0895* (2013.01)

(58) Field of Classification Search
None
See application file for complete search history.

(56) References Cited

U.S. PATENT DOCUMENTS

| 7,840,753 | B1 | 11/2010 | Booth |
| 2011/0093651 | A1 | 4/2011 | Kurashige |

FOREIGN PATENT DOCUMENTS

| JP | 2009-043030 | 2/2009 |
| JP | 2010-108341 | 5/2010 |
| JP | 2011-090460 | 5/2011 |
| JP | 2012-118853 | 6/2012 |
| JP | 2012-252514 | 12/2012 |

*Primary Examiner* — Midys Rojas
(74) *Attorney, Agent, or Firm* — Finnegan, Henderson, Farabow, Garrett & Dunner, LLP

(57) ABSTRACT

According to one embodiment, there is provided a storage controller for use in a tiered storage system. The tiered storage system includes a first storage device having the first physical volume of a first tier, and a second storage device having the second physical volume of a second tier lower than the first tier. The cache controller of the storage controller divides the storage area of the first physical volume into a set of data areas and a set of cache areas. The cache controller changes the first cache area of the first physical volume to a first data area, when first data to be transferred from the second physical volume to the first physical volume is also stored in the first cache area.

15 Claims, 11 Drawing Sheets

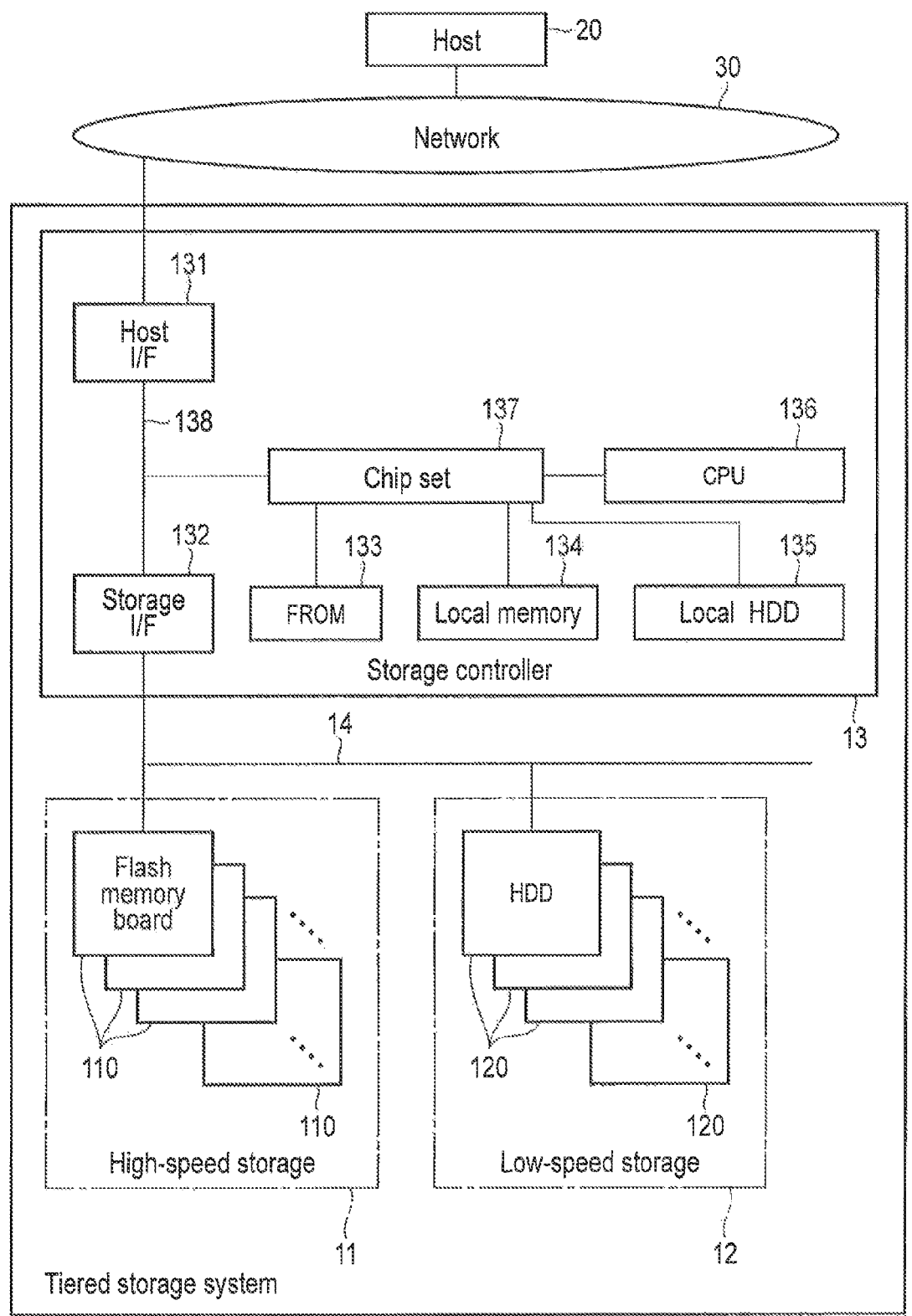
F I G. 1

| Physical volume ID | Page number | Logical volume ID | LBA | Flash storage | Cache utilization | Replication-destination: replication-source | Access characteristics | |
|---|---|---|---|---|---|---|---|---|
| | | | | | | | Access count | Last access date/time |
| .... | .... | .... | .... | .... | .... | .... | .... | .... |
| 0 | 2 | 1 | LBA5 | Yes | No | 100-4::N/A | 208 | 2013/10/15 17:34 |
| 0 | 3 | 2 | LBA10 | Yes | No | N/A::N/A | 33 | 2012/05/13 08:10 |
| 0 | 4 | N/A | N/A | Yes | Yes | N/A::N/A | 1000 | 2013/10/22 18:20 |
| .... | .... | .... | .... | .... | .... | .... | .... | .... |
| 100 | 4 | N/A | N/A | No | No | N/A::0-2 | 322 | 2013/03/11 03:44 |
| 100 | 5 | 2 | LBA30 | No | No | N/A::N/A | 500 | 2013/05/01 11:32 |
| .... | .... | .... | .... | .... | .... | .... | .... | .... |

| Logical volume ID | LBA | Physical volume ID | Page number |
|---|---|---|---|
| 0 | LBA0 | 0 | 0 |
| 0 | LBA1 | 0 | 1 |
| 0 | LBA2 | 1 | 2 |
| 0 | LBA3 | 1 | 3 |
| 0 | LBA4 | 2 | 0 |
| ⋮ | ⋮ | ⋮ | ⋮ |
| 2 | LBA30 | 100 | 5 |
| ⋮ | ⋮ | ⋮ | ⋮ |

135b

F I G. 4

| Cache ID | Logical volume ID | LBA | Physical volume ID | Page number |
|---|---|---|---|---|
| 0 | 2 | LBA30 | 0 | 4 |
| 1 | 3 | LBA0 | 100 | 45 |
| ⋮ | ⋮ | ⋮ | ⋮ | ⋮ |

135c

F I G. 5

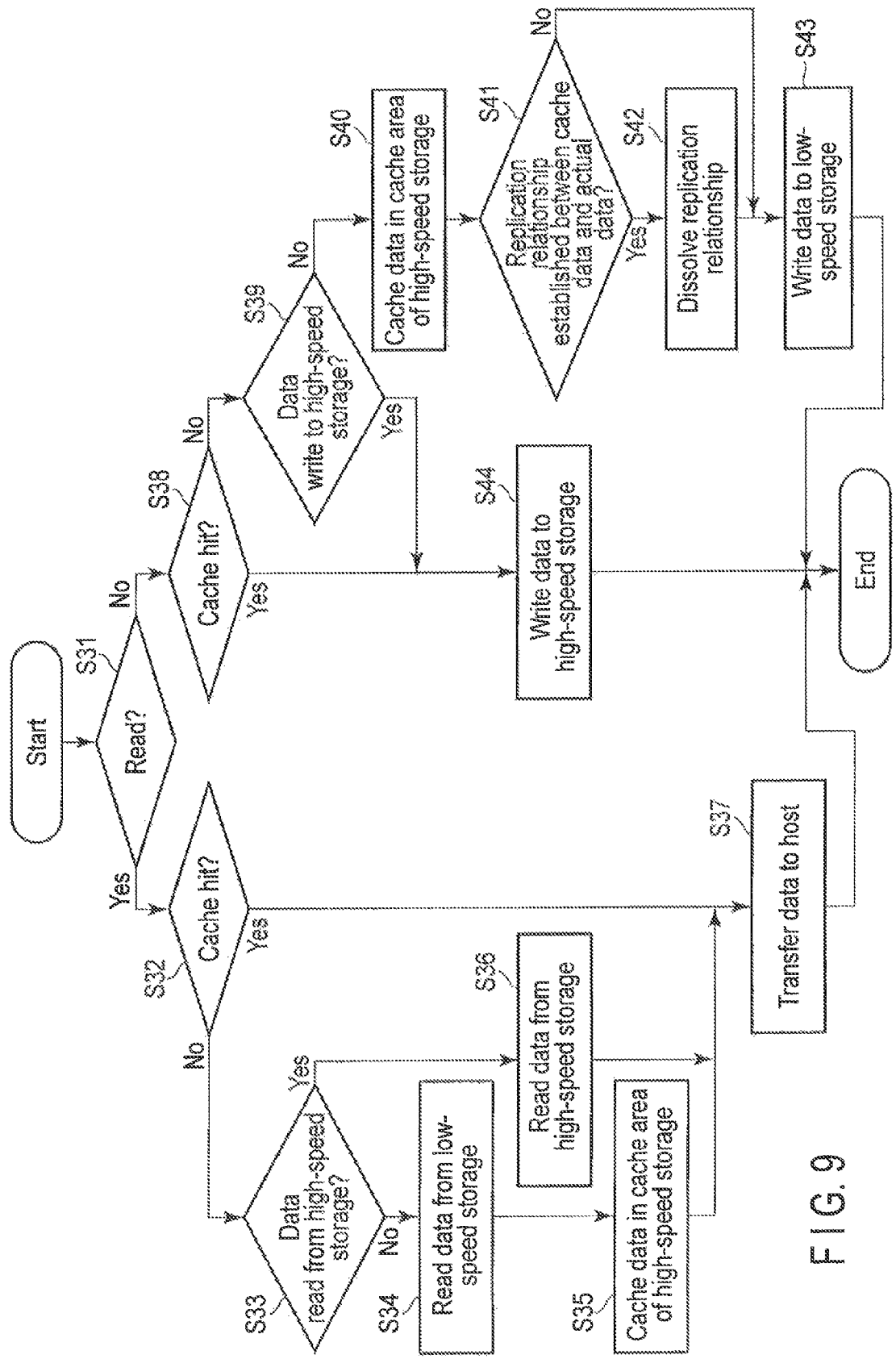
F I G. 9

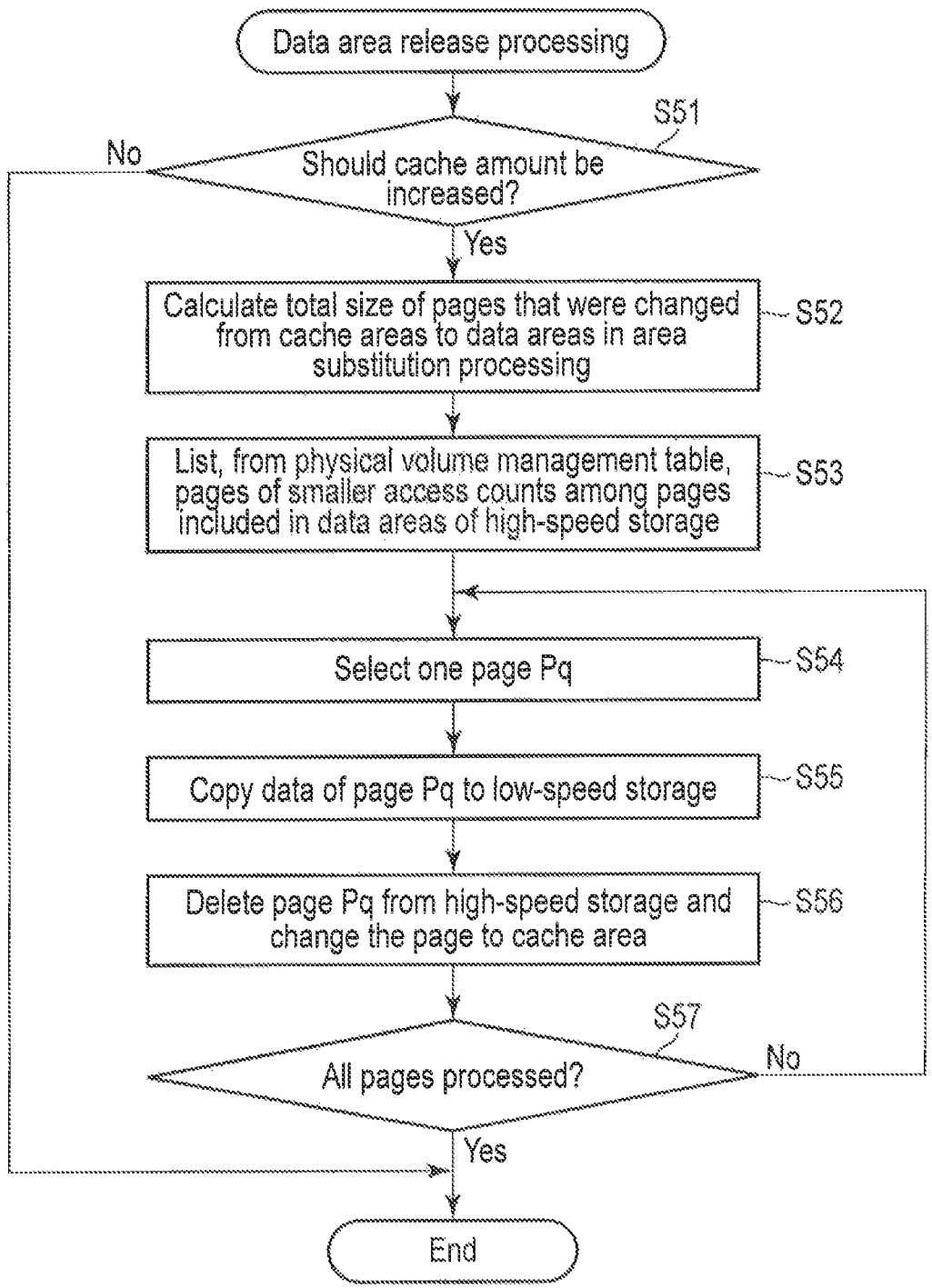
F I G. 10

TIERED STORAGE SYSTEM, STORAGE CONTROLLER AND METHOD OF SUBSTITUTING DATA TRANSFER BETWEEN TIERS

CROSS-REFERENCE TO RELATED APPLICATIONS

This application is a Continuation Application of PCT Application No. PCT/JP2014/052309, filed Jan. 31, 2014, the entire contents of which are incorporated herein by reference.

FIELD

Embodiments described herein relate generally to a tiered storage system, a storage controller and a method of substituting data transfer between tiers.

BACKGROUND

Various storage devices utilizing a storage tiering technique have recently been developed. The storage tiering technique ties together the physical storage areas (hereinafter, referred to as physical volumes) of various types of storage devices of different performances. As a result, the storage tiering technique constructs at least one virtual storage area (hereinafter, referred to as a logical volume) including a plurality of physical volumes as entities. Logical volumes can be recognized by a host computer, and are provided thereto. The storage tiering technique further determines a storage device that should store data, in accordance with a data characteristic, such as an access frequency. Namely, in the storage tiering technique, data is stored in a plurality of storage devices in a tiered manner. In the storage tiering technique, a set of storage devices (physical volumes) of the same type is called "a tier." In general, storage devices of higher performances are allocated to a higher-tier. A storage system utilizing the storage tiering technique is called a tiered storage system.

In the tiered storage system, when data of, for example, a high access frequency is to be stored in the logical volume, a storage controller generally stores the data in the physical volume of a storage device of a higher performance (i.e., of a higher tier) among physical volumes associated with the logical volume. Further, a data characteristic, such as the access frequency, changes over time. In accordance with a change in the data characteristic, the storage controller changes a data storage destination. Namely, the storage controller transfers/rearranges data between physical volumes (tiers) in accordance with a change in the data characteristic.

In general, data that is accessed frequently or is required to have high responsiveness is only part of the data stored in a storage device. In view of the fact that a high-performance storage device is high in unit price per unit storage capacity, it is not preferable to store all data in a high-performance storage device. Therefore, in the tiered storage system, the storage controller stores data of a high access frequency in a storage device (of an upper tier) excellent in access performance, such as a flash storage device. Further, the storage controller stores data of a low access frequency in an inexpensive storage device (of a lower tier), such as a hard disk drive or a magnetic tape device. Since a greater part of the data is thus stored in the inexpensive storage device, the cost required for constructing a storage system can be reduced.

In the tiered storage system, when the characteristics of data have changed, the data is transferred between the tiers as mentioned above. For this data transfer, the storage controller collects a data characteristic, such as the access frequency, for each piece of data (more specifically, for each mass of data of a predetermined size). Based on the collected data characteristic, the storage controller determines data to be changed in the tier of its storage destination at, for example, regular intervals T. The storage controller transfers the thus-determined data.

However, if the time interval T is set relatively long, it is difficult to quickly transfer data whose characteristics have changed. In contrast, if the time interval T is set relatively short, data transfer is performed frequently. In this case, regardless of whether data is transferred from the lower tier to the upper tier or vice versa, the number of times of data input/output between storage devices (hereinafter, referred to as data transfer input/output) increases. Increase in the number of times of data transfer input/output will involve degradation of input/output performance in normal data access. Further, if concentration of access to data transferred to the upper tier is just temporary, it is desirable to transfer the data to the lower tier after, for example, the frequency of access to the data decreases. At this time, however, data transfer input/output will occur as a result.

As described above, in the conventional tiered storage system, there is a trade-off between "suppression of data transfer between tiers" and "maintaining of input/output performance (suppression of data access to the lower tier)."

A conventional cache technique is known as a method of increasing the speed of access to a low-speed storage device. A cache technique of utilizing part of the storage area of a high-speed storage device as a cache for a low-speed storage device is also known. In this technique, data stored in the cache can be maintained in its input/output performance without data transfer between tiers.

Assume here that the conventional, cache technique is applied to the conventional tiered storage system, and that data of the lower tier is stored in the cache. In this case, access of data to the lower tier can be suppressed. However, it is difficult to suppress a data transfer input/output that occurs when data is transferred to the upper tier by a tiered storage function.

Further, in the conventional techniques, data is stored in a cache, regardless of to which tier data access is performed. Accordingly, the cache contains both upper tier data and lower tier data. In particular, in the cache, the ratio of the data of the higher tier is high. This is because access to the data of the higher tier is generally higher in frequency. This means that the area for caching data of the lower tier is reduced, which results in increase in data access to the lower tier.

It is an object of the invention to provide a tiered storage system and a storage controller capable of maintaining an input/output performance with physical data transfers between tiers suppressed, and a method of substituting a data transfer between the tiers.

BRIEF DESCRIPTION OF THE DRAWINGS

FIG. 1 is a block diagram showing an exemplary hardware configuration of a computer network system according to an embodiment;

FIG. 3 is a view showing a data structure example of a physical volume management table shown in FIG. 2;

FIG. 4 is a view showing a data structure example of a logical volume management table shown in FIG. 2;

FIG. 5 is a view showing a data structure example of a cache management table shown in FIG. 2;

FIG. 9 is a flowchart showing an exemplary procedure of an input/output processing in the embodiment;

FIG. 10 is a flowchart showing an exemplary procedure of a data area release processing included in the area substituting processing;

DETAILED DESCRIPTION

Figure 2:
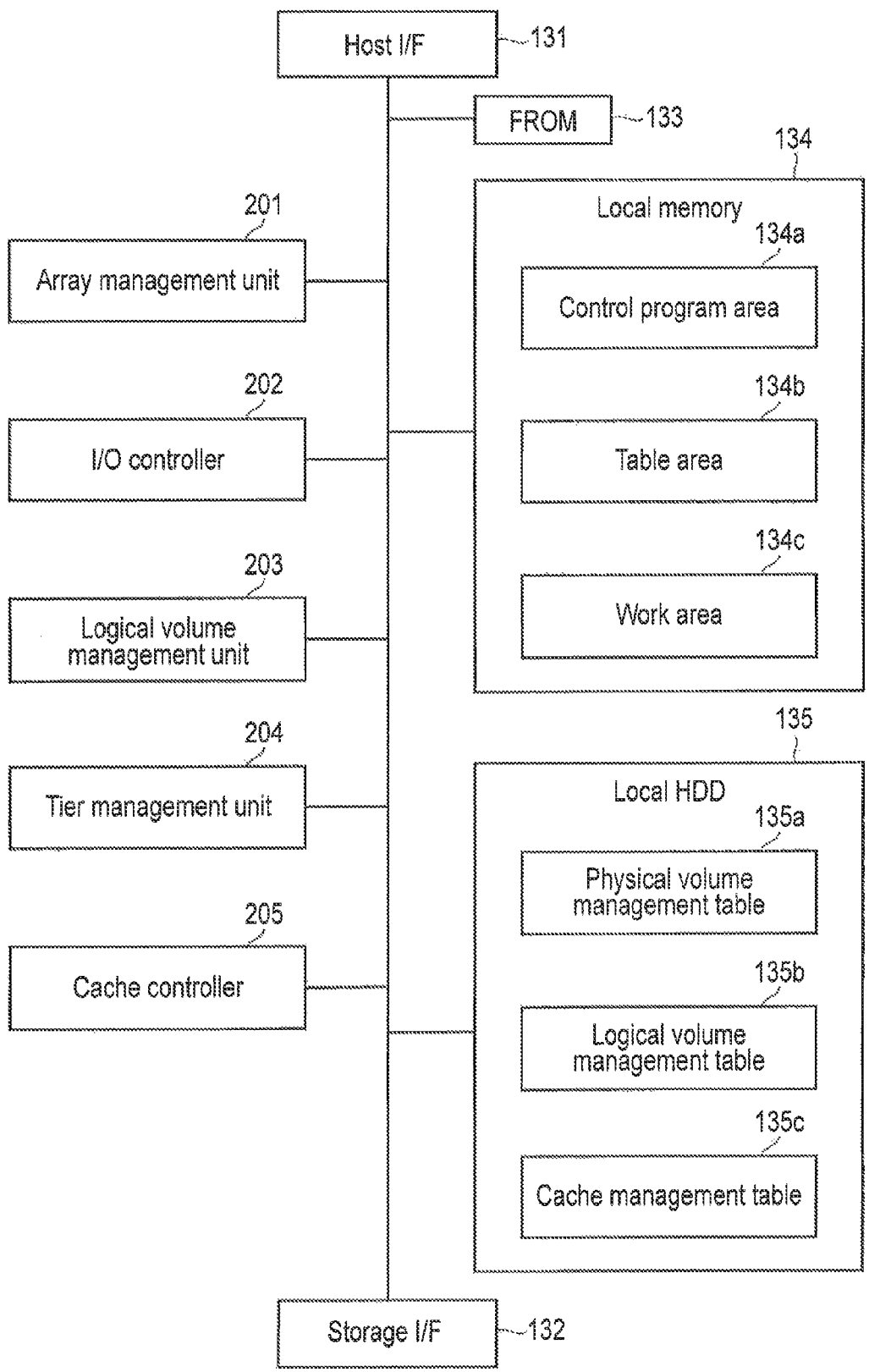
FIG. 2 is a block diagram mainly showing an exemplary functional configuration of a storage controller shown in FIG. 1.

Various embodiments will be described with reference to the accompanying drawings.

In general, according to one embodiment, there is provided a storage controller, for use in a tiered storage system, configured to process an input/output request from a host computer. The tiered storage system comprises a first storage device including a first physical volume, and a second storage device including a second physical volume, having a lower access speed than the first storage device, and having a greater storage capacity than the first storage device. The storage controller comprises a logical volume management unit, a tier management unit, and a cache controller. The logical volume management unit is configured to provide the host computer with a logical volume logically constructed using the first and second physical volumes. The tier management unit is configured to manage the first physical volume as a first tier and the second physical volume as a second tier lower than the first tier, and to determine or change a tier for storing data, based on a characteristic of the data. The cache controller is configured to divide a storage area of the first physical volume into a set of data areas for storing data, and a set of cache areas for storing cache data, and to cause the set of cache areas to function as a cache for the tiered storage system. The cache controller is further configured to change a first cache area of the first physical volume to a first data area when the tier management unit determines that first data stored in the second physical volume should be transferred to the first physical volume, and when the first data is also stored in the first cache area.

FIG. 1 is a block diagram showing an exemplary hardware configuration of a computer network system according to an embodiment. As shown, the computer network system comprises tiered storage system 10, host computer (hereinafter, the host) 20 and network 30. Tiered storage system 10 (more specifically, storage controller 13 incorporated in tiered storage system 10) is connected to host 20 via network 30. Host 20 utilizes tiered storage system 10 as an external storage device. Network 30 is, for example, a storage area network (SAN), the Internet or an intranet. The Internet or intranet is formed of, for example, Ethernet (trademark).

Tiered storage system 10 comprises high-speed storage device (hereinafter, the high-speed storage) 11, low-speed storage device (hereinafter, the low-speed storage) 12, storage controller 13 and storage interface bus 14. High-speed storage 11 is formed of for example, a flash storage array called a flash RAID (redundant arrays of inexpensive disks or redundant arrays of independent disks). In the embodiment, high-speed storage 11 is realized using a plurality of flash memory boards 110. Each flash memory board 110 includes a set of flash memories. Further, each flash memory board 110 may include a set of rewritable nonvolatile memories other than the flash memories. High-speed storage 11 is connected to storage interface bus 14.

The storage area of high-speed storage 11 is used, divided into a set of data areas and a set of cache areas. In the embodiment, the total size of the data area set and that of the cache area set are not fixed, but are dynamically changed as described later. The data areas are used to store normal data (actual data). The cache areas are used as storage caches for storing cache data.

Low-speed storage 12 is formed of, for example, a hard disk drive (HDD) array called RAID. In the embodiment, low-speed storage 12 is realized using a plurality of HDDs 120 having a lower access speed than the flash memory. Namely, the access performance (access speed) of low-speed storage 12 is lower than that of high-speed storage 11. Low-speed storage 12 is connected to storage interface bus 14. High-speed storage 11 and low-speed storage 12 do not always have to have an array structure.

In general, in the storage tiering technique, the unit in which storage devices of the same type are collected up is called a tier. Further, storage devices of a higher access performance are allocated to a higher-tier. Similarly, storage devices of a lower access performance are allocated to a lower-tier. The tiered storage system shown in FIG. 1 includes two types of storage devices having different access performances, i.e., high-speed storage 11 and low-speed storage 12. In this case, high-speed storage 11 is allocated to the upper-tier (first-tier), and the low-speed storage 12 is allocated to the lower-tier (second-tier). Namely, in the embodiment, the tier corresponding to high-speed storage 11 having a first access performance higher than a certain reference access performance is called an upper tier, and the tier corresponding to low-speed storage 12 having a second access performance lower than the certain reference access performance is called a lower tier. Tiered storage system 10 may further comprise a low-speed storage (a low-speed storage of a third tier), such as a magnetic tape device, lower than low-speed storage 12.

Storage controller 13 is connected to high-speed storage 11 and low-speed storage 12 via storage interface bus 14. The interface type of the storage interface bus 14 is, for example, a small computer system interface (SCSI), a fiber channel (FC), a serial attached SCSI (SAS) or a serial AT attachment (SATA).

Storage controller 13 controls high-speed storage 11 and low-speed storage 12. Storage controller 13 comprises an array management function (array management unit 201), an input/output (I/O) control function (I/O controller 202), a logical volume management function (logical volume management unit 203), a tier management function (tier management unit 204) and a cache control function (cache controller 205).

Storage controller 13 (more specifically, CPU 136 incorporated in storage controller 13) constructs a flash storage array (i.e., high-speed storage 11) comprising a plurality of flash memory boards 110, using the array management function. Similarly, storage controller 13 (CPU 136) constructs an HDD array (i.e., the low-speed storage 12) comprising a plurality of HDDs 120, using the array management function.

Storage controller 13 (CPU 136) processes a request from host 20, using the I/O control function. If the request from host 20 is a data access request, processing is transferred to storage I/F 132.

Storage controller 13 (CPU 136) constructs (defines) a logical volume to be provided to host 20 (i.e., a logical volume recognizable by host 20), using the logical volume management function. In the embodiment, the logical volume indicates a virtual storage area formed using physical volumes (first and second physical volumes) in high-speed storage 11 and low-speed storage 12. Namely, the logical volume is logically realized using the real physical storage areas in high-speed storage 11 and low-speed storage 12.

Storage controller 13 (CPU 136) manages the storage areas of high-speed storage 11 and low-speed storage 12 as upper and lower tiers, respectively, using the tier management function. Also, storage controller 13 (CPU 136) hierarchically manages data using the tier management function. Namely, storage controller 13 (CPU 136) classifies the data in the logical volume into the upper and lower tiers, in accordance with a data characteristic, such as an access frequency. Storage controller 13 (CPU 136) further performs a data transfer between the tiers, using the tier management function. More specifically, based on physical volume management table 135*a* described later, storage controller 13 (CPU 136) transfers, to another physical volume, data (actual data) in a physical storage area corresponding to data in a logical volume, in accordance with a data characteristic, such as the access frequency. For instance, when data of a high access frequency is stored in a physical volume in low-speed storage 12 (i.e., a storage device of a low access performance), storage controller 13 (CPU 136) transfers the data to a physical volume in high-speed storage 11 (i.e., a storage device of a high access performance). The data transfer between the storage devices (tiers) is performed via storage I/F 132.

Storage controller 13 (CPU 136) performs data access to the cache area (i.e., reads and writes data from and to the cache area), using the cache control function. Storage controller 13 (CPU 136) also manages part of storage area of high-speed storage 11 as a cache, using the cache control function. Namely, based on cache management table 135*c* described later, storage controller 13 (CPU 136) divides, for management, the storage area of high-speed storage 11 into the aforementioned sets of data areas and cache areas, using the cache control function. Storage controller 13 (CPU 136) further performs cache control for suppressing a data transfer (more specifically, a physical data transfer) between the storage devices, using the cache control function.

Storage controller 13 comprises host interface controller (hereinafter, host I/F) 131, storage interface controller (hereinafter, storage I/F) 132, flash ROM (FROM) 133, local memory 134, local HDD 135, CPU 136, chip set 137 and internal bus 138. Storage controller 13 is connected to host 20 via host I/F 131 and network 30. The interface type of host I/F 131 is, for example, SC or internet SCSI (iSCSI).

Host I/F 131 controls a data transfer (data transfer protocol) from and to host 20. Host I/F 131 receives, from host 20, a request of data access (a read or write request) to a logical volume, and supplies host 20 with a response to the data access request. Upon receiving the data access request from host 20, host I/F 131 transfers the request to CPU 136 via internal bus 138 and chip set 137. Upon receiving the data access request, CPU 136 processes the data access request in accordance with a storage control program described later.

Storage I/F 132 has an input/output (I/O) driver, and receives an I/O request based on the data access request (the write or read request associated with the logical volume) received from host 20 by CPU 136 (storage control program). In accordance with the received I/O request, storage I/F 132 accesses the cache area in high-speed storage 11, the data area in high-speed storage 11, or low-speed storage 12.

FROM 133 is a rewritable nonvolatile memory, and stores initial program loader (IPL). The IPL is a program initially executed by CPU 136 when storage controller 13 is activated.

Local memory 134 is a rewritable nonvolatile memory, such as a DRAM. A part of the area of local memory 134 is used to store a storage control program copied from local HDD 135. Another part of the area of local memory 134 is used as a work area for CPU 136.

Local HDD 135 is used to store a storage control program executed by CPU 136. CPU 136 executes IPL upon activation of storage controller 13, and thus loads, onto local memory 134, the storage control program stored in local HDD 135. The storage control program may be stored in FROM 133.

CPU 136 functions as array management unit 201, I/O controller 202, logical volume management unit 203, tier management unit 204 and cache controller 205 in accordance with program codes of the storage control program loaded on local memory 134. Namely, CPU 136 executes the storage control program, stored in local memory 134, via chip set 137, thereby controlling the entire tiered storage system 10 (in particular, each element of storage controller 13).

Chip set 137 is a bridge circuit for coupling CPU 136 and its peripheral circuits to internal bus 138. Internal bus 138 is a versatile bus, and is, for example, a peripheral component interconnect (PCI) express bus. Host I/F 131, storage I/F 132 and chip set 137 are connected to each other via internal bus 138. Further, FROM 133, local memory 134, local HDD 135 and CPU 136 are connected to internal bus 138 via chip set 137.

FIG. 2 is a block diagram mainly showing an exemplary hardware configuration of storage controller 13 shown in FIG. 1. Storage controller 13 comprises array management unit 201, I/O controller 202, logical volume management unit 203, tier management unit 204 and cache controller 205. These functional elements 201 to 205 are software modules realized when CPU 136 in storage controller 13 executes the storage control program. However, at least one of the functional elements 201 to 205 may be realized by a hardware module.

Local memory 134 comprises control program area 134*a*, table area 134*b* and work area 134*c*. Control program area 134*a* is used to store at least part of the storage control program. The storage control program is beforehand stored in local HDD 135 as mentioned above, and at least part of the storage control program executed by CPU 136 is loaded from local HDD 135 to control program area 134*a* during activation of storage controller 13.

Table area 134*b* is used to store at least part of various tables stored in local. HDD 135. Work area 134*c* is used to temporarily store data that is used when CPU 136 executes the storage control program.

Local HDD 135 (i.e., a local storage device) stores physical volume management table 135*a*, logical volume management table 135*b* and cache management table 135*c*, as well as the above-mentioned storage control program. These management tables 135a, 135b and 135c are loaded for use from local HDD 135 to table area 134b of local memory 134 during activation of storage controller 13. Accordingly, if any one of the management tables loaded to local memory 134 is updated, the updated state is appropriately reflected in the corresponding management table in local HDD 135. However, for simplifying the description, it is hereinafter assumed that physical volume management table 135a, logical volume management table 135b and cache management table 135c are used when they are stored in local HDD 135.

Each entry of physical volume management table 135a is used to hold information that indicates which storage area of which logical volume corresponds to a storage area in a physical volume included in the tiered storage system 10 more specifically, in the high-speed storage 11 and the low-speed storage 12 in the tiered storage system 10). Each entry of physical volume management table 135a is also used to hold information indicative of each access characteristic (e.g., an access frequency and an access date/time) of a storage area in a physical volume. The information held in each entry of physical volume management table 135a is called physical volume management information.

Each entry of logical volume management table 135b is used to hold information that indicates which storage area of which physical volume corresponds to a storage area in a logical volume constructed in the tiered storage system 10. The information held in each entry of logical volume management table 135b is called logical volume management information.

In the embodiment, each storage area of each logical volume is called an LBA area designated by a logical block address (LBA), and a storage area of a physical volume corresponding to the storage area (LBA area) of the logical volume is called a page (physical page). Each LBA area and each page are both formed of a plurality of blocks. In the embodiment, a block is also called a sector, and is a minimum unit for permitting storage controller 13 to access the storage via storage interface bus 14. As described above, in the embodiment, the size of each LBA area is equal to the size of one page. However, the size of each LBA area may be equal to the total size of a plurality of pages.

Each entry of cache management table 135c is used to hold information that indicates which storage area (LBA) of which logical volume corresponds to data (i.e., cache data) in a cache area. The information held in each entry of cache management table 135c is called cache management information.

FIG. 3 is a view showing a data structure example of physical volume management table 135a shown in FIG. 2. Each entry of physical volume management table 135a comprises a physical volume identifier (ID) field, a page number field, a logical volume ID field, a logical block address (LBA) field, a flash storage field, a cache utilization field, a replication-destination: :replication-source field, and an access characteristic field. Symbol "N/A" in physical volume management table 135a shown in FIG. 3 means "not applicable."

The physical volume ID field is used to hold the ID of a physical volume PVj including a page (physical page) Pi to be managed by a corresponding entry in physical volume management table 135a (hereinafter, referred to simply as "the corresponding entry"). The page number field is used to hold the page number Pi of the page Pi. In physical volume management table 135a shown in FIG. 3, it is assumed that physical volume ID=0 indicates a physical volume in high-speed storage 11, and physical volume ID=100 indicates a physical volume in low-speed storage 12.

The logical block address (LBA) field is used to hold an LBA (corresponding LBA) indicative of an LBA area (more specifically, an LBA area in a logical volume) corresponding to the page Pi denoted by the page number Pi in the corresponding entry. The logical volume ID field is used to hold the ID (corresponding logical volume ID) of a logical volume formed of a plurality of LBA areas that include an LBA area indicated by an LBA in the corresponding entry. Physical volume management table 135a of FIG. 3 shows that, for example, a page of page number 5 in a physical volume with the physical volume ID of 100 (i.e., low-speed storage 12) is associated with LBA area LBA30 in a logical volume with a logical volume ID of 2.

The flash storage field is used to hold a flag (flash storage flag) indicative of whether the page Pi exists in a flash storage array (i.e., high-speed storage 11). If the page Pi exists in the flash storage array, it is used either as a data area or as a cache area.

The cache utilization field is used to hold a flag (cache utilization flag) indicative of whether the page Pi is used as a cache area (this is a cache area in the flash storage array, i.e., in high-speed storage 11). In the embodiment, if the cache utilization flag indicates that the page Pi is used as the cache area, the flash storage flag indicates that the page Pi exists in the flash storage array. In this case, the logical volume ID and LBA corresponding to the page Pi are N/A. Further, if the logical volume ID and LBA corresponding to the page Pi are not N/A, this means that the data of the page Pi is actual data, and the pace Pi is being used (i.e., it is not a free area). Physical volume management table 135a of FIG. 3 shows that, for example, a page of page number 4 in a physical volume with a physical volume ID of 0 (i.e., high-speed storage 11) is used as a cache area. In the description below, the page of page number 4 in the physical volume with the physical volume ID of 0 is expressed as page 0-4.

The replication-destination: :replication-source field is used to hold information (replication-destination: :replication-source information) associated with the replication destination and replication source (replication-destination: :replication-source) of the page Pi. Replication-destination: :replication-source information N/A: :N/A indicates that there is no replication destination or source of the page Pi. Replication-destination: :replication-source information other than N/A: :N/A indicates that there is a replication destination or source of the page Pi, i.e., that there is another page (replication destination or source) having the same data as that of the page Pi.

More specifically, replication-destination: :replication-source information a-b: :N/A indicates that the page Pi is a replication source, and therefore that the replication destination of the page Pi exists and is page a-b. As aforementioned, page a-b is a page of page number b in a physical volume with a physical volume ID of a. Similarly, replication-destination: :replication-source information N/A: :c-d indicates that the page Pi is a replication destination, and therefore that the replication source of the page Pi exists and is page c-d.

In the embodiment, when a page Pix is a replication source, a page Piy is a replication destination, and the data of the page Pix (replication source) is updated, the data of the page Piy (replication destination) is deleted, in this case, the replication relationship between the pages Pixel and Piy is resolved. Namely, the replication destination of the page Pix and the replication source of the page Piy are changed to N/A.

The access characteristic field is used to hold information indicative of the number of accesses (i.e., access count) to the page Pi and the last access time and date associated therewith. This information indicates the data characteristic of the page Pi. The number of accesses to the page Pi is incremented by one whenever the page Pi is accessed.

FIG. 4 is a view showing a data structure example of logical volume management table 135b shown in FIG. 2. Each entry of logical volume management table 135b comprises a logical volume ID field, an LBA field, a physical volume ID field and a page number field.

The logical volume ID field of logical volume management table 135b is used to hold the ID of a logical volume LVq that includes an LBA area LBAp managed by a corresponding entry. The LBA field of logical volume management table 135b is used to hold logical block address LBAp for the LBA area LBAp.

The logical volume ID field of logical volume management table 135b is used to hold the ID of a physical volume corresponding to the LBAp. The page number field of logical volume management table 135b is used to hold a page number associated with a page corresponding to the LBAp (i.e., a corresponding page in the physical volume).

FIG. 5 a view showing a data structure example of cache management table 135c shown in FIG. 2. Each entry of cache management table 135c comprises a cache ID field, a logical volume ID field, an LBA field, a physical volume ID field and a page number field.

The cache ID field of cache management table 135c is used to hold the ID (cache ID) of a cache area CAs managed by the corresponding entry. The logical volume ID field of cache management table 135c is used to hold the ID of a logical volume that includes an LBA area LBAt corresponding to the cache data stored in the cache area CAs. The LBA field of cache management table 135c is used to hold a logical block address LBAt for the LBA area LBAt.

The physical volume ID field of cache management table 135c is used to hold the ID of a physical volume corresponding to the logical block address LBAt. The page number field of cache management table 135c is used to hold a page number associated with a page (i.e., a page in a physical volume) corresponding to the logical block address LBAt. Cache management table 135c of FIG. 5 shows that, for example, the data in LBA area LBA30 in a logical volume with a logical volume ID of 2 is cached on a page (cache page or cache area) of page number 4 in a physical volume with the physical volume ID of 0 (i.e., the high-speed storage 11).

Figure 6:
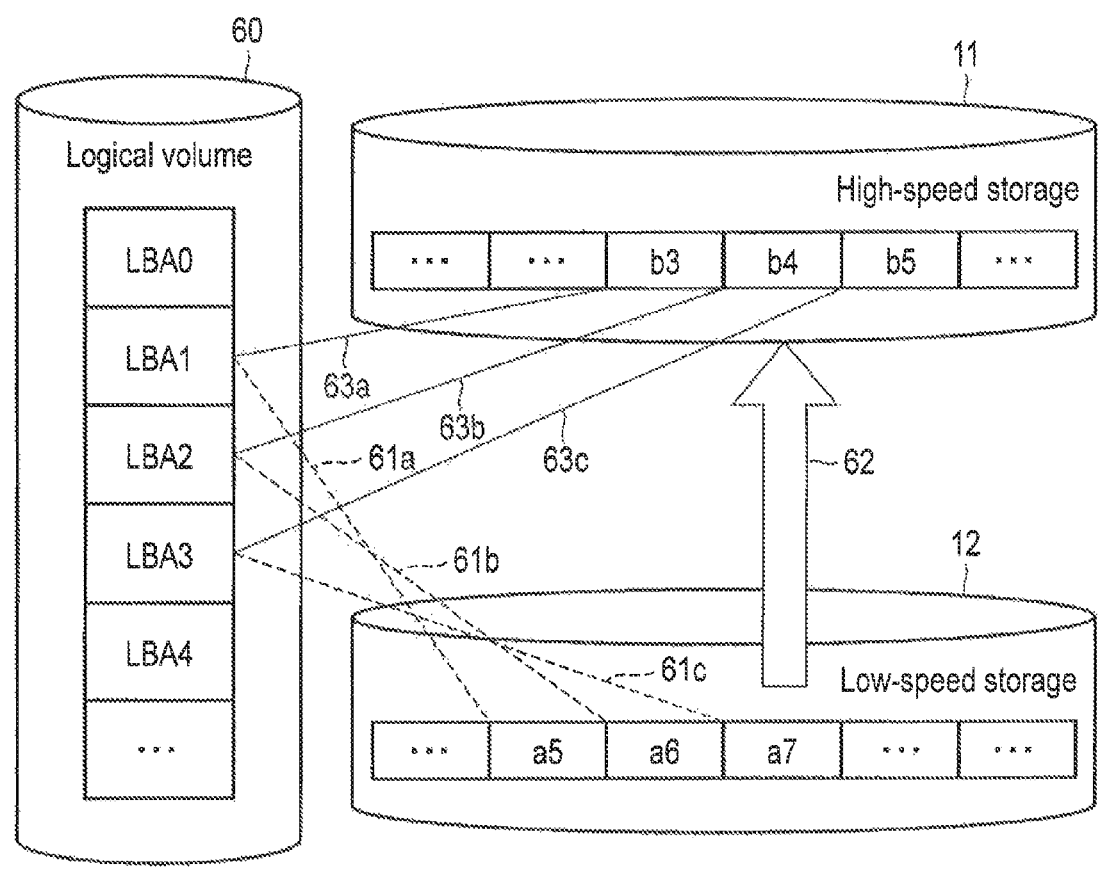
FIG. 6 is a view showing an example of a data transfer between tiers in the embodiment.

FIG. 6 shows an example of a data transfer between tiers in the embodiment. As described above, the high-speed storage 11 and the low-speed storage 12 shown in FIG. 6 are allocated to the upper- and lower-tiers, respectively. High-speed storage 11 includes pages b3, b4 and b5, and low-speed storage 12 includes pages a5, a6 and a7. It is assumed that pages a5, a6 and a7 store actual data, while none of pages b3, b4 and b5 stores actual data (effective actual data). Namely, it is assumed that pages b3, b4 and b5 are free pages (areas). In the embodiment, the page size is 4 kilobytes (KB), and the block (sector) size is 512 bytes (B). Further, addresses are assigned to respective blocks. In this case, one page is formed of 8 blocks associated with sequential 8 addresses.

In FIG. 6, logical volume 60 is formed of a set of LBA areas. The set of LBA areas include LBA areas LBA0, LBA1, LBA2, LBA3 and LBA4 designated by LBAs (logical block addresses) 0, 1, 2, 3 and 4, respectively. LBA area LBA0 is the leading LBA area of logical volume 60, and corresponds to a range defined by addresses 0 to 7. LBA area LBA1 follows LBA area LBA0, and corresponds to a range defined by addresses 8 to 15. LBA area LBA2 follows LBA area LBA1, and corresponds to a range defined by addresses 1 to 23. LBA area LBA3 follows LBA area LBA2, and corresponds to a range defined by addresses 24 to 31. LBA area LBA4 follows LBA area LBA3, and corresponds to a range defined by addresses 32 to 39.

It is assumed here that pages a5, a6 and a7 of low-speed storage 12 are mapped on LBA areas LBA1, LBA2 and LBA3 of logical volume 60, as indicated by broken lines 61a, 61b and 61c in FIG. 6. In this state, it is assumed that the data characteristic (e.g., access frequency) of the data stored on pages a5, a6 and a7 has changed (increased). At this time, CPU 136 functions as tier management unit 204, and transfers the data in pages a5, a6 and a7 of low-speed storage 12 to, for example, pages b3, b4 and b5 of high-speed storage 11, as indicated by arrow 62 in FIG. 6. After this data transfer, CPU 136 (tier management unit 204) dissolves the mapping associated with pages a5, a6 and a7 and LBA areas LBA1, LBA2 and LBA3, thereby newly mapping pages b3, b4 and b5 on LBA areas LBA1, LBA2 and LBA3 of logical volume 60, as indicated by solid lines 63a, 63b and 63c in FIG. 6. Namely, CPU 136 (tier management unit 204) associates LBAs, which were associated with the physical addresses of the three pages in the lower tier before the data transfer, with the respective physical addresses of three pages in the upper tier after the data transfer.

By thus transferring the data on pages a5, a6 and a7 in the lower tier to pages b3, b4 and b5 in the upper tier, the tier of the data (more specifically, the tier of the data in LBA areas LBA1, LBA2 and LBA3) is changed from the lower tier to the upper tier. Namely, tier changing generally involves data transfer (physical data transfer) between tiers. The embodiment realizes a tier changing processing capable of changing the tier of data from the lower tier to the upper tier, with transfer of data from the lower tier to the upper tier significantly suppressed.

Figure 7:
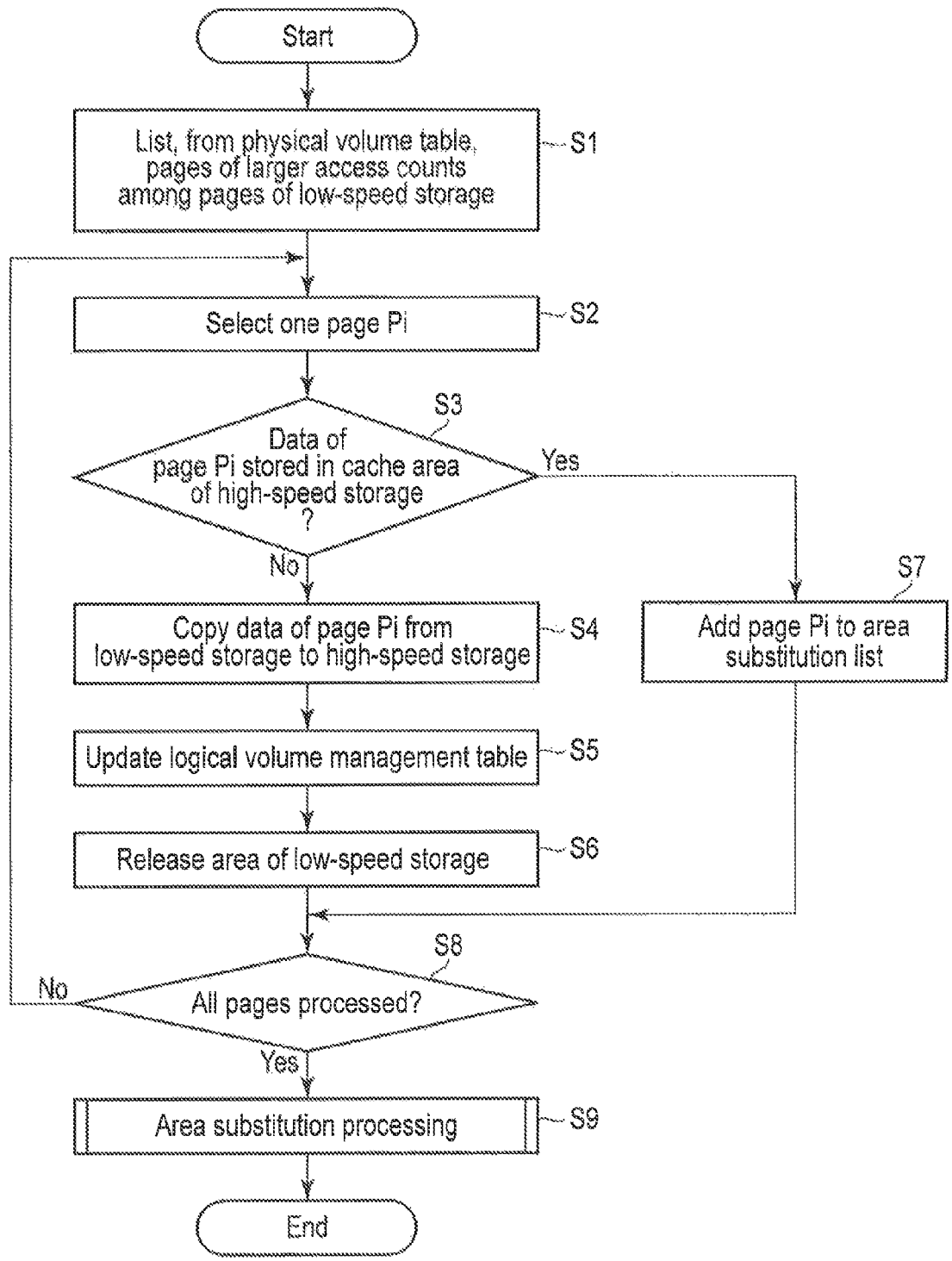
FIG. 7 is a flowchart showing an exemplary procedure of a tier changing processing in the embodiment.

Referring then to FIG. 7, a description will be given of the tier changing processing employed in the embodiment. FIG. 7 is a flowchart showing an exemplary procedure of the tier changing processing in the embodiment. The tier changing processing is mainly performed by tier management unit 204 and cache control unit 205.

Firstly, tier management unit 204 lists, from physical volume management table 135a, L pages of larger access counts among the pages of low-speed storage 12 (step S1). It is assumed here that the number L of the pages to be listed is designated by, for example, host 20 in accordance with a user's operation. However, the number L of the pages may be predetermined. Further, a threshold for the access count may be designated by host 20 or be predetermined. In this case, tier management unit 204 lists pages whose access counts exceed the threshold. If the number of pages whose access counts exceed the threshold is greater than L, tier management unit 204 may list L pages whose access counts are larger among the pages. The page numbers of the listed pages are stored in work area 134c of local, memory 134.

Tier management unit 204 selects one from the listed page numbers stored in local memory 134. Namely, tier management unit 204 selects one page Pi from the set of pages listed (step S2).

At this time, control is passed from tier management unit 204 to cache controller 205. Cache controller 205 executes determination step S3 associated with the page Pi as follows: Firstly, cache controller 205 refers to the corresponding entry in physical volume management table 135a based on the physical volume ID and page number of the page Pi, thereby specifying a combination of a logical volume IDs and a logical block address LBAt corresponding to the page Pi. Subsequently, cache controller 205 refers to cache management table 135c, and determines whether the combination of the logical volume IDs and the logical block address LBAt corresponding to the page Pi exists in cache management table 135c. Based on the determination result, cache controller 205 determines whether the data of the page Pi is stored in a cache area of high-speed storage 11.

If the data of the page Pi is not stored in the cache area or high-speed storage 11 (No in step S3), cache controller 205 determines that the data (actual data) of the page Pi in low-speed storage 12 is newest one. In this case, cache controller 205 returns control to tier management unit 204. At this time, tier management unit 204 secures one free data area (namely, a free page Pf) in a set of data areas in high-speed storage 11. Tier management unit 204 causes storage I/F 132 to copy the data of the page Pi from low-speed storage 12 to the free page Pf secured in high-speed storage 11 (step S4).

After that, tier management unit 204 updates logical volume management table 135b to reflect the state after copying, as described below (step S5). Firstly, tier management unit 204 specifies an entry of logical volume management table 135b, which includes the combination of the logical volume IDs and the logical block address LBAt. Subsequently, tier management unit 204 updates the physical volume ID and the page number in the specified entry from the physical volume ID indicative of low-speed storage 12 and the page number of the page Pi to the physical volume ID indicative of high-speed storage 11 and the page number of the page Pf as a copy destination.

Thereafter, tier management; unit 204 proceeds to step S6. In step S6, tier management unit 204 releases the area for the page Pi in low-speed storage 12. Namely, tier management unit 204 updates, to N/A, each of a logical volume ID and a logical block address LBA set in the entry of physical volume management table 135a corresponding to the physical volume ID and page number of the page Pi. Tier management unit 204 also updates a logical volume ID and a logical block address LBA set in the entry (corresponding entry) of physical volume management table 135a corresponding to the physical volume ID and page number of the page Pf as a copy destination, to the logical volume IDs and the logical block address LBAt associated with the page Pi before the area for the page Pi is released. By the above-described steps S4 to S6, the data (actual data) of the page Pi in low-speed storage 12 is transferred to the page Pf in high-speed storage 11.

After that, tier management unit 204 determines whether processing has been executed on all of the pages listed in step S1 (step S8). If a not-yet-processed page remains (No in step 38), tier management unit 204 returns to step S2, and selects a subsequent page Pi. Cache controller 205 determines whether the data of the page Pi is stored in a cache area of high-speed storage 11 (step S3).

It is assumed here that the data of the page Pi is stored in the cache area (hereinafter, the corresponding cache area) of high-speed storage 11 (Yes in step 33). Namely, it is assumed that the data (actual data) of the page Pi is stored in low-speed storage 12, and is also stored (cached) as cache data in the corresponding cache area (page) of high-speed storage 11. In this case, cache controller 205 determines that the data of the page Pi can be substantially (logically) transferred to a data area in high-speed storage 11, without being physically transferred from low-speed storage 12 to high-speed storage 11. More specifically, cache controller 205 determines that the data of the page Pi can be logically transferred to the corresponding cache area by re-defining the corresponding cache area of high-speed storage 11 as a data area. The processing of redefining the corresponding cache area as a data area will be referred to as an area substituting processing. Thus, the area substituting processing means processing of changing a certain number of cache areas in high-speed storage 11 to data areas in order to suppress a data transfer from the lower tier to the upper tier.

As described above, in physical volume management table example 135a of FIG. 3, logical volume management table example 135b of FIG. 4 and cache management table example 135c of FIG. 5, the cache data of page 100-5 (i.e., the data in LBA area LBA30 in a logical volume with a logical volume ID of 2 corresponding to page 100-5) is stored on page (cache area) 0-4. Accordingly, when the page Pi is, for example, page 100-5, i.e., when the page Pi is a page of physical volume ID=100 and page number=5, the determination in step S3 is Yes.

If the determination in step S3 is Yes, cache controller. 205 determines that the page Pi (e.g., page 100-5) should be subjected to area substitution, in this case, cache controller 205 adds, to an area substitution list, information associated with the page Pi (step S7). The area substitution list is stored in local memory 134. The information associated with the page Pi includes the physical volume ID and page number of the page Pi, and the physical volume ID and page number of the corresponding cache area. When the page Pi is page 100-5, the information associated with the page Pi includes physical volume ID=100 and page number=5, and physical volume ID=0 and page number=4.

After step S7, cache controller 205 returns control to tier management unit 204. Then, tier management unit 204 determines whether all pages listed in step S1 have been processed (step S8). If all pages have been processed (Yes in step S8), tier management unit 204 again passes control to cache controller 205. Then, cache controller 205 performs an area substitution processing for changing cache areas to data areas, on all pages listed in the area substitution list (step S9). Thus, the area substitution processing is finished.

As described above, in the embodiment, if it is determined that the data of the page Pi in the lower tier (low-speed storage 12) should be transferred to the upper tier (high-speed storage 11) because of a change in access characteristic (i.e., data characteristic) (steps S1 and S2), cache controller 205 executes step S3. If the data of the page Pi is cached in a cache area (Yes in step S3), cache controller 205 changes the page Pi from the cache area (cache page) to a data area (real data page) (step S9).

In the embodiment, the above-mentioned area change (substitution) enables an advantage equivalent to that obtained by a data transfer to be obtained without physically transferring the data of the page Pi from the lower tier to the upper tier. In other words, in the embodiment, simply by changing the attribute of the data of the page Pi from cache data to actual data, the same advantage as obtained by a data transfer can be realized. As a result, in the embodiment, data transfers can be suppressed.

Also in the embodiment, a set of cache areas secured in high-speed storage 11 is used as a cache for tiered storage system 10. Accordingly, data stored in the lower tier (low-speed storage 12) can be cached in the upper tier (high-speed storage 11), whereby a data access to the lower tier can be suppressed without data transfers between the tiers.

Figure 8:
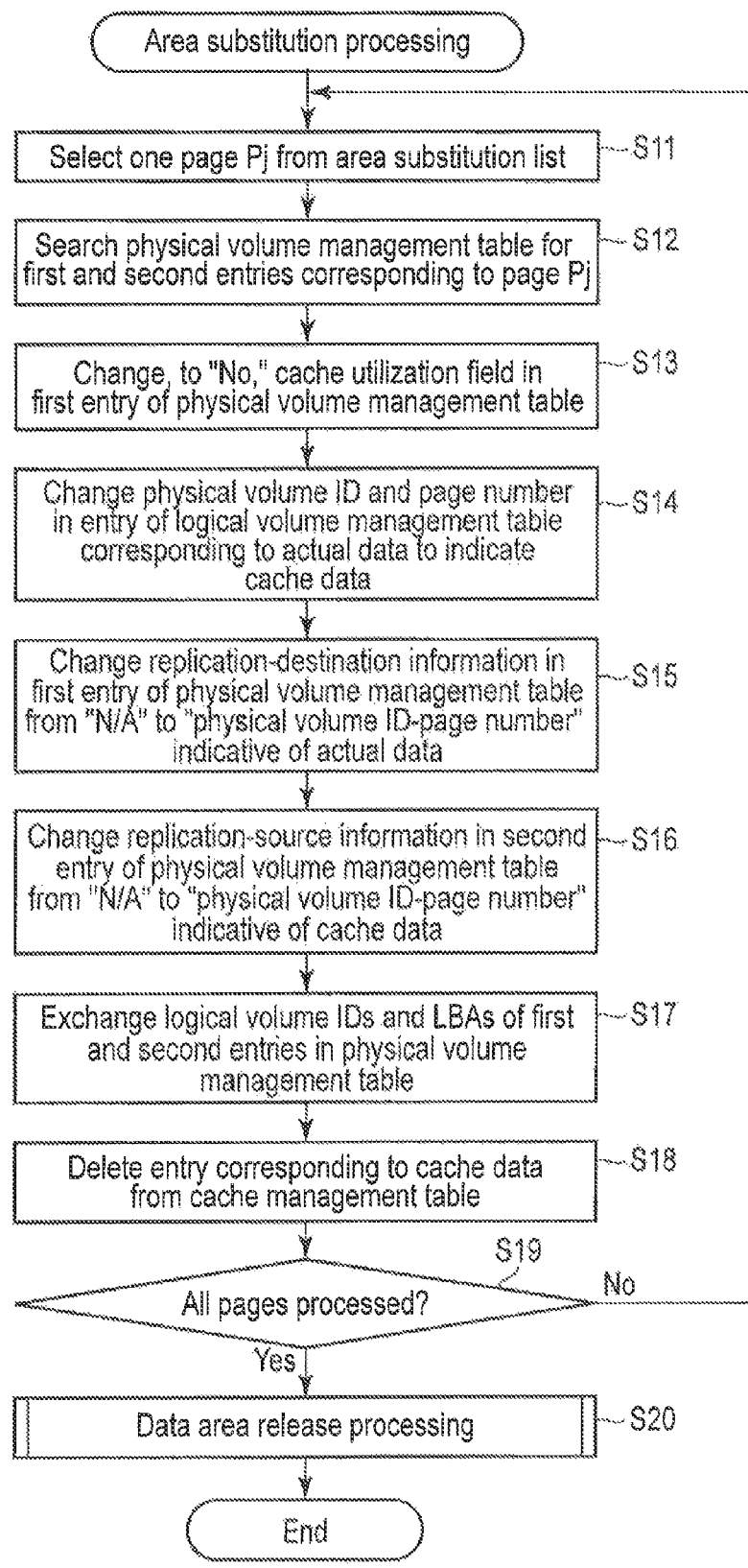
FIG. 8 is a flowchart showing an exemplary procedure of an area substituting processing included in the tier changing processing.

Referring then to FIG. 8, a detailed description will be given of the area substitution processing (step 39) included in the above-described tier changing processing. FIG. 8 is a flowchart showing an exemplary procedure of the area substituting processing. Firstly, cache controller 205 selects one page Pj (more specifically, information associated with the page Pj) from the area substitution list stored in local memory 134 (step S11). As described above, the area substitution list shows a set of pages whose data is determined, in the tier changing processing, to be stored as cache data in cache areas of high-speed storage 12. Further, the information associated with the page Pj includes the physical volume ID and page number of the page Pj, and the physical volume ID and page number of the corresponding cache area.

Subsequently, cache controller 205 searches for first and second entries corresponding to the page Pj as follows (step S12): Firstly, cache controller 205 searches for the first entry in physical volume management table 135a, based on the physical volume ID and page number of the cache area corresponding to the page Pj. The first entry includes the physical volume ID and page number of the cache area corresponding to the page Pj. Similarly, cache controller 205 searches for the second entry in physical volume management table 135a, based on the physical volume ID and page number of the page Pj. The second entry includes the physical volume. ID and page number of the page Pj. If the page Pj is page 100-5, an entry including the physical volume ID=0 and page number=4 of the corresponding cache area is searched for as the first entry, and an entry including physical volume ID=100 and page number=5 is searched for as the second entry.

Thereafter, cache controller 205 changes the content (cache utilization flag) of the cache utilization field of the first entry in physical volume management table 135a from "Yes" to "No" (step S13). Thereafter, cache controller 205 changes the physical volume ID and page number of an entry of logical, volume management table 135b corresponding to actual data (i.e., the actual data of the page Pj) to indicate a page currently storing the cache data of the page Pj (i.e., the cache area corresponding to the page Pj) (step S14). If the page Pj is page 100-5 and the cache area corresponding to the page Pj is page 0-4, step S14 is executed as follows:

Firstly, cache controller 205 refers to cache management table 135c, and obtains logical volume ID=2 and logical block address LBA=LBA30 from an entry of physical volume ID=0 and page number=4. Subsequently, cache controller 205 specifies a corresponding entry in logical volume management table 135b, which entry includes the obtained logical volume ID=2 and logical block address LBA=LBA30. After that, cache controller 205 changes the physical volume ID and page number of the specified corresponding entry in logical volume management table 135b from 100 and 5 to 0 and 4, respectively. As a result, the cache area (i.e., page 0-4) corresponding to the page Pj is changed to a data area, and the cache data in page 0-4 is used as actual data.

Thereafter, cache controller 205 changes replication destination information in the replication destination: :replication-source field of the first entry in physical volume management table 135a from "N/A" to "physical volume ID-page number" indicative of actual data (more specifically, indicative of an area having stored the actual data of the page Pj), namely, changes the replication destination information to "physical volume ID-page number" in the second entry (step S15). After that, cache controller 205 changes replication source information in the replication-destination: : replication-source field of the second entry in physical volume management table 135a from "N/A" to "physical volume ID-page number" indicative of the corresponding cache area (more specifically, indicative of an area currently storing the cache data of the page Pj), namely, changes the replication source information to "physical volume ID-page number" in the first entry (step S16). If the page P1 is page 100-5 and the cache area corresponding to the page Pj is page 0-4, the replication destination information in the first entry in physical volume management table 135a is changed to 100-5, and the replication source information in the second entry in physical volume management table 135a is changed to 0-4. As a result, page 0-4 in the upper tier changed to a data area (i.e., cache data used as the actual data of page 0-4) is associated with page 100-5 in the lower tier (i.e., the old actual data of page 100-5) by the respective replication-destination: :replication-source fields.

As described above, the data of page 0-4 (more specifically, the page changed to a data area) of the upper tier and the data of page 100-5 of the lower tier, which are associated by the replication-destination: :replication-source fields, are identical to each other. Namely, the same data is stored on page 0-4 of the upper tier and page 100-5 of the lower tier. Therefore, in view of effective use of the storage areas, it is preferable that page 100-5 of the lower tier be released as a non-allocated area. However, attention should be paid to a case where the data logically transferred to page 0-4 of the upper tier by changing area definition may become data to be re-transferred to the lower tier in future because of a change in data characteristic (such as a reduction in access frequency). In such a case, if page 100-5 of the lower tier is released as a non-allocated area, the data of page 0-4 of the upper tier is transferred to the lower tier. In the embodiment, however, page 100-5 of the lower tier is not released as a non-allocated area and is associated with page 0-4 (more specifically, a page changed to a data area) of the upper tier (steps S13 to S15). This state is maintained until the data of page 0-4 of the upper tier is updated, as will be described with reference to steps S31 and S38 to S41 in FIG. 9. It is assumed here that the necessity of transferring the data of page 0-4 of the upper tier has occurred. At this time, if the data of page 0-4 of the upper tier is still not updated, it is identical to the data of page 100-5 of the lower tier that remains unreleased. Therefore, in the embodiment, the use of the remaining data of page 100-5 of the lower tier provides the same effect as a data transfer without physically transferring the data of page 0-4 of the upper tier to the lower tier. Thus, in the embodiment, data transfer can be suppressed.

Subsequently, cache controller 205 exchanges the logical volume IDs and LBAs of the first and second entries in physical volume management table 135a (step S17). After this exchange, cache controller 205 changes the logical volume ID and LBA fields of the second entry to "N/A." After that, cache controller 205 deletes, from cache management table 135c, an entry corresponding to the cache data of the page Pj (page 100-5) (step S18).

Thereafter, cache controller 205 determines whether all pages shown in the area substitution list have been processed (step S19). If a non-processed page still exists (No in step S19), the above-described steps 311 to S18 are re-executed. After executing steps 311 to S18 on all pages shown in the area substitution list (Yes in step S19), cache controller 205 proceeds to step 320. In step S20, cache controller 205 executes a data area release processing. Thus, the area substitution processing is finished. The data area release processing is performed to newly change (return), to a cache area, a data area to which one of the cache areas was changed previously.

Referring then to FIG. 9, a description will be given of an I/O (input/output) processing employed in the embodiment. FIG. 9 is a flowchart showing an exemplary procedure of the I/O processing. The I/O processing is executed by I/O controller 202 and cache controller 205 when I/O controller 202 has received an I/O request (command). The I/O request is issued by, for example, host 20, and includes a combination of a logical volume ID and an LBA indicative of an access destination, and information indicative of the type of I/O (read or write).

Assume here that I/O controller 202 has received an I/O request from host 20 via host I/F 131. In this case, I/O controller 202 determines whether the received I/O request is, for example, a read request (step S31). If the received I/O request is a read request (Yes in step S31), I/O controller 202 passes control to cache controller 205.

Cache controller 205 determines whether the data designated by the received I/O request is hit in a cache (i.e., a data exists in a cache area) of high-storage 11 (step S32). Cache controller 205 executes this determination based on whether an entry including the combination of the logical volume ID and the LBA included in the received I/O request can be detected in cache management table 135c.

If no data is hit in a cache area (No in step S32), cache controller 205 determines whether the read request indicates a data read from high-speed storage 11, as follows (step S33). Firstly, cache controller 205 searches logical volume management table 135b for a combination of a physical volume ID and a page number associated with the combination of the logical volume ID and LBA included in the received I/O request. Subsequently, cache controller 205 refers to a flash storage flag in an entry of physical volume management table 135a that includes the searched combination of the physical volume ID and the page number. Based on the referred flash storage flag, cache controller 205 determines whether the read request indicates a data read from high-speed storage 11.

If the read request does not indicate a data read from high-speed storage 11 (No in step S33), cache controller 205 proceeds to step S34. In step 34, cache controller 205 causes I/O controller 202 to read, via storage I/F 132, data from an area of low-speed storage 12 designated by the searched combination of the physical volume ID and the page number. After that, cache controller 205 caches the data read from the area of low-speed storage 12 in a cache area of high-speed storage 11 via storage I/F 132 (step S35). After that, cache controller 205 returns control to I/O controller 202. Then, I/O controller 202 causes host I/F 131 to transfer, to host 20, the data read from low-speed storage 12 (step S37).

In contrast, if the read request indicates a data read from high-speed storage 11 (Yes in step S33), cache controller 205 proceeds to step S36. In step 34, cache controller 205 causes I/O controller 202 to read, via storage I/F 132, data from a data area of high-speed storage 11 designated by the searched combination of the physical volume ID and the page number. Thus, if the read request indicates a data read from high-speed storage 11, cache controller 205 does not cache the read data in a cache area of high-speed storage 11, but returns control to I/O controller 202. I/O controller 202 causes host I/F 131 to transfer, to host 20, the data read from high-speed storage 11 (step S37).

Meanwhile, if the data designated by the I/O request is hit in a cache area (Yes in step S32), cache controller 205 obtains, via storage I/F 132, cache data stored in a corresponding cache area of high-speed storage 11. This cache area is specified by the combination of the physical volume ID and the page number included in the entry detected in cache management table 135c for the determination in step S32. I/O controller 202 causes host I/F 131 to transfer, to host 20, the cache data obtained by cache controller 205 from the specified cache area (step S37).

It is assumed here that the received I/O request is not a read request (No in step S31). Namely, the received I/O request is assumed to be a write request. In this case, cache controller 205 determines whether cache data corresponding to write data designated by the received I/O request is hit in a cache, i.e., exists in a cache area of high-speed storage 11. Cache controller 205 performs this determination in the same way as in step S32.

If the cache data is not hit in a cache (No in step S38), cache controller 205 determines whether the write request indicates a data write to high-speed storage 11, as follows (step S39): Firstly, cache controller 205 searches logical, volume management table 135b for a combination of a physical volume ID and a page number associated with the logical volume ID and the LBA included in the received I/O request. Subsequently, cache controller 205 refers to a flash storage flag in an entry of physical volume management table 135a that includes the searched physical volume ID and page number. Based on the referred flash storage flag, cache controller 205 determines whether the write request indicates a data write to high-speed storage 11.

If the write request does not indicate a data write to high-speed storage 11 (No in step S39), cache controller 205 proceeds to step S40. In step S40, cache controller 205 caches write data designated by the received I/O request in a corresponding cache area of high-speed storage 11 via storage I/F 132.

Thereafter, cache controller 205 determines whether the cache data and the actual data are in a replication relationship (step S41). If these data pieces are determined to be in the replication relationship (Yes in step S41), cache controller 205 determines that the replication relationship has broken, because the cache data differs from the actual data.

Therefore, cache controller 205 releases the replication relationship between them as follows (step S42): Firstly, cache controller 205 searches physical volume management table 135a for an entry associated with the logical volume ID and the LBA included in the received I/O request. Namely, cache controller 205 searches physical volume management table 135a for an entry associated with a page as a write destination designated by the received I/O request. Subsequently, cache controller 205 changes, to "N/A," replication source information in the replication-destination: :replication-source field of the searched entry. The replication source information before this change assumes a value other than "N/A" if the same data exists in the corresponding cache area. Cache controller 205 also searches physical volume management table 135a for an entry corresponding to a cache area indicated by the replication source information before the change. Cache controller 205 changes, to "N/A," replication destination information in the replication-destination: :replication-source field of the searched entry. As a result, the replication relationship between the cache data and the actual data is dissolved. After that, cache controller 205 returns control to I/O controller 202. I/O controller 202 writes write data, designated by the received I/O request, to low-speed storage 12 via storage I/F 132 (step S43).

In contrast, if the above-mentioned data pieces are out of the replication relationship (No in step S41), cache controller 205 returns control to I/O controller 202. I/O controller 202 writes write data, designated by the received I/O request, to low-speed storage 12 via storage I/F 132 (step S43).

Meanwhile, if the cache data is hit in a cache (Yes in step S38), cache controller 205 proceeds to step S44. Further, even if the cache data is not hit in a cache (No in step S38), cache controller 205 proceeds to step S44 in the case of a data write to high-speed storage 11 (Yes in step S39). In step S44, cache controller 205 does not cache the designated write data in the above-mentioned cache area of high-speed storage 11, but causes I/O controller 202 to write the write data via storage I/F 132 to the data area of high-speed storage 11 designated by the searched combination of the physical volume ID and the page number (step 344).

As described above, in the embodiment, if the I/O request from host 20 is a read request (Yes in step S31), and if the read request does not designate a data read from high-speed storage 11 (No in step S33), cache controller 205 caches the data, read from low-speed storage 12, in the cache area of high-speed storage 11 (steps S34 and S35). In contrast, if the read request designates a data read from high-speed storage 11 (Yes in step S33), cache controller 205 does not cache the data, read from high-speed storage 11, in the cache area of high-speed storage 11 (step S36).

Further, if the I/O request from host 20 is a write request (No in step S31), and the write request does not designate a data write to high-speed storage 11 (No in step S39), cache controller 205 caches write data in the cache area of high-speed storage 11 (step S40). In contrast, if the write request designates a data write to high-speed storage 11 (Yes in step S39), cache controller 205 does not cache the write data (step S44).

Thus, in the embodiment, data cached in the cache areas is limited to data of the lower tier, and data of the upper tier the same storage device as the cache areas, i.e., high-speed storage 11) is prevented from being stored in the cache areas. As a result, the amount of lower-tier data that can be stored in the cache areas is increased compared to the case where upper-tier data is also stored in the cache areas, whereby the number of data accesses to the lower tier can be reduced. This also contributes to reduction of deficiency in storage capacity due to replicate storage of the same data in the storage device of the upper tier.

Referring then to FIG. 10, the data area release processing (step S20) included in the above-described area substitution processing will be described in detail. FIG. 10 is a flowchart showing an exemplary procedure of the data area release processing. Firstly, cache controller 205 determines whether the size (cache amount) of the cache secured in high-speed storage 11 should be increased than the present size (step S51). When cache areas have been changed to data areas in the area substitution processing, the cache amount is reduced. In this state, if, for example, the number of I/O operations to the lower tier is increased, the I/O performance of the tiered storage system may decrease. To prevent reduction in the I/O performance of the tiered storage system, it is necessary to maintain the cache amount at an appropriate value. The appropriate cache amount (hereinafter, referred to as a target cache amount) is determined based on, for example, locality (i.e., biasing) of data access, or the entire storage capacity of high-speed storage 11. There is a conventional method of calculating such a target cache amount.

If the I/O performance of the tiered storage system may be reduced because the cache amount becomes smaller than the target cache amount as a result of the area substitution processing, cache controller 205 determines that the cache amount should be increased (Yes in step S51). In this case, cache controller 205 calculates the size by which the cache amount is reduced with respect to the target cache amount (step S52). For simplifying the description, it is assumed that the cache amount before the area substitution processing is performed is equal to the target cache amount. Cache controller 205 calculates, as the size of deficiency, the total size of pages that have been changed by the area substitution processing from the cache areas to the data areas.

Subsequently, cache controller 205 lists pages that should be used to supplement the deficiency size (i.e., that should be changed from data areas to cache areas) (step S53). More specifically, cache controller 205 lists, from physical volume management table 135a, M pages, which are included in data areas of the high-speed storage 11, and to which lower numbers of accesses (i.e., M pages of smaller access counts) were made. In this example, the M pages are listed in an increasing order of access count. The size of the M pages is equal to the size of deficiency.

Thereafter, cache controller 205 selects one page Pq from the listed pages (step S54), and passes control to tier management unit 204. Then, tier management unit 204 copies (transfers) the data of the page Pq (i.e., the page Pq in high-speed storage 11) to, for example, a page Ppd in low-speed storage 12 under the control of cache controller 205 (step S55). In step S55, tier management unit 204 updates physical volume management table 135a and logical volume management table 135b such that data the copy (transfer) to the page Ppd is reflected. Namely, tier management unit 204 updates a corresponding entry of logical volume management table 135b such that a logical volume IDu and an LBAv associated, in logical volume management table 135b, with the page Pq will be newly associated with the page Ppd. Further, in step S55, tier management unit 204 updates an entry of physical volume management table 135a corresponding to the page Ppd such that the page Ppd is newly associated, in physical volume management table 135a, with the logical volume IDu and the LBAv. After that, tier management unit 204 returns control to cache controller 205.

Then, cache controller 205 deletes (releases) the page Pq from the above-mentioned data area of high-speed storage 11, and changes the page Pq to a cache area (step S56). More specifically, cache controller 205 changes, from "No" to "Yes," a cache flag in an entry of physical volume management table 135a corresponding to the page Pq. Further, cache controller 205 changes, to "N/A," all of the logical volume ID, LBA, replication-destination: :replication-source information, and access characteristics in the entry of physical volume management table 135a corresponding to the page Pq. As a result, the page Pq is released from the data area, and is changed to a free area that can be used as a cache area.

Cache controller 205 cooperates with tier management unit 204, and repeats the above-described steps S54 to S56 on the M pages listed in step S53 (step S57). If the determination in step S51 is No, cache controller 205 finishes the data area release processing without releasing the data area.

As described above, in the embodiment, when the data areas are needed to be changed to the cache areas (Yes in step S51), cache controller 205 preferentially releases data areas (pages) of the upper tier having lower access accounts (steps S53 to S56). The data stored in data areas of the upper tier having small access counts should be changed to be stored in the lower tier. In general, when data areas of the upper tier are released and changed to cache areas, it is necessary to transfer, to the lower tier, the data in the data areas to be released. This is because if data areas in the upper tier are released and nothing else is done, the data in the data areas will be lost. To avoid this, in the embodiment, data included in the data of the data areas and having a low possibility of being re-transferred to the upper tier (i.e., the data whose storage destination should be changed to the lower tier) is preferentially transferred to the lower tier. As a result, a data transfer from the lower tier to the upper tier is suppressed.

Figure 11:
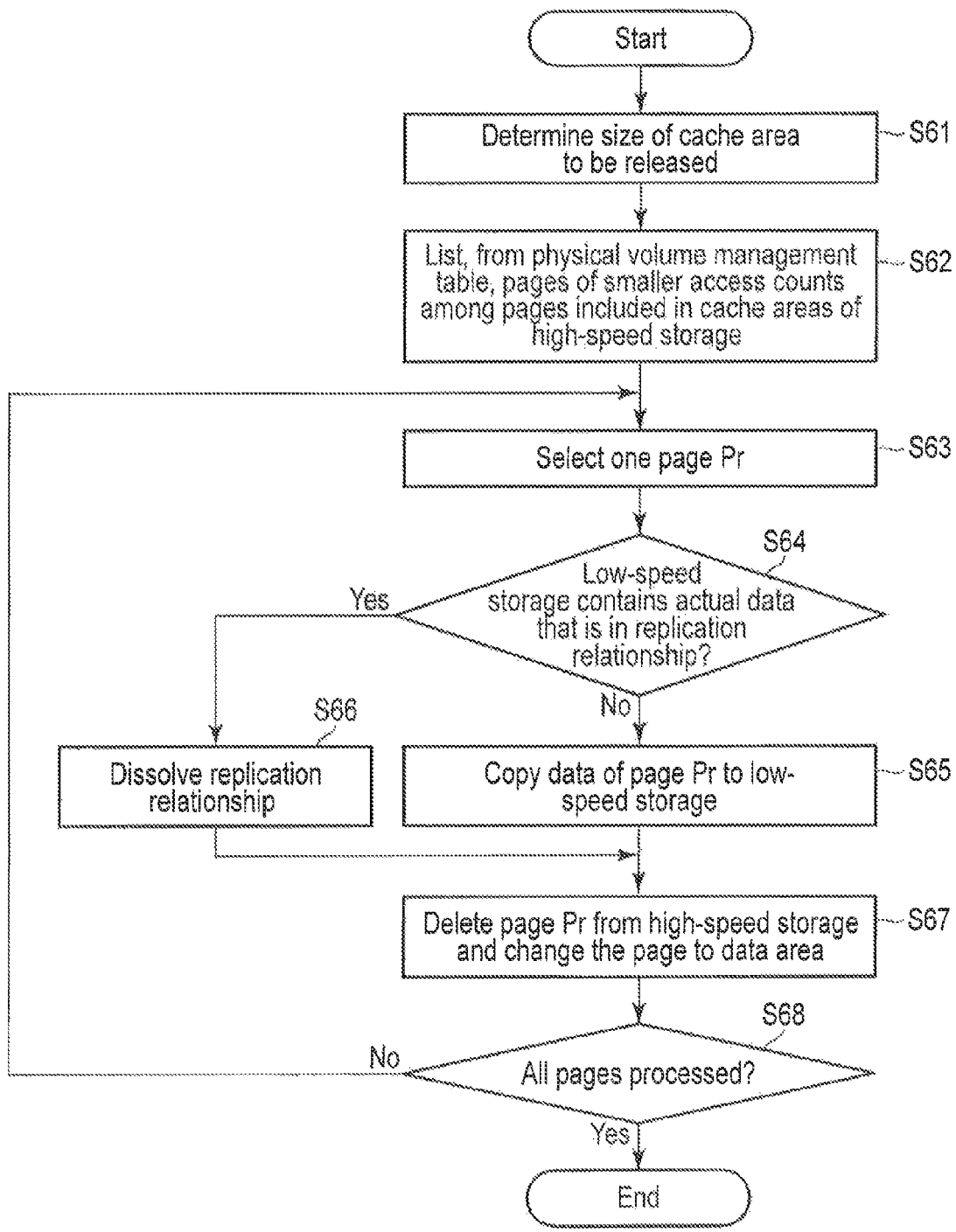
FIG. 11 is a flowchart showing an exemplary procedure of a cache area release processing in the embodiment.

Referring to FIG. 11, a description will be given of a cache area release processing employed in the embodiment. FIG. 11 is a flowchart showing an exemplary procedure of the cache area release processing in the embodiment. The cache area release processing is performed when high-speed storage 11 is short of data area, in contrast to the data area release processing.

Firstly, cache controller 205 determines the total size of cache areas to be released (step S61). Subsequently, cache controller 205 lists pages (cache pages) to be used to refill, the determined size (i.e., pages that should be changed from the cache areas to data areas) (step S62). Namely, cache controller 205 lists, from physical volume management table 135a, N pages of smaller access counts among pages included in the above-mentioned cache areas of high-speed storage 11. In this example, the N pages are listed in an increasing order of access count. The total size of the N pages is equal to the size determined in step S61.

After that, cache controller 205 selects one page (cache page) Pr from the listed pages (step S63). After that, cache controller 205 determines whether actual data that is in a replication relationship with the cache data of the page Pr (i.e., the page Pr in high-speed storage 11) exists in low-speed storage 12 (step S64). Cache controller 205 performs this determination based on whether the replication destination in an entry of physical volume management table 135a corresponding to the page Pr is other than "N/A."

If the replication destination is "N/A," cache controller 205 determines that low-speed storage 12 does not contain actual data that is in a replication relationship with the cache data of the page Pr (No in step S64). The fact that actual data, which is in a replication relationship with the cache data of the page Pr, does not exist means that the cache data is dirty data. The fact that the cache data is dirty data means that the cache data is not reflected as actual data in low-speed storage 12.

If the determination in step S64 is No, cache controller 205 passes control to tier management unit 204. Then, tier management unit 204 copies (transfers) the data of the page Pr to, for example, a page Ppc in low-speed storage 12 under the control of cache controller 205 (step S65). In step S65, tier management unit 204 updates physical volume management table 135a and logical volume management table 135b such that the data copy (transfer) to the page Ppc is reflected, as in the aforementioned data copy to the page Ppd. Thereafter, tier management unit 204 returns control to cache controller 205. Cache controller 205 proceeds to step S67.

In contrast, if the replication destination is other than "N/A," cache controller 205 determines that low-speed storage 12 contains actual data that is in a replication relationship with the cache data of the page Pr (Yes in step S64). The fact that actual data, which is in a replication relationship with the cache data of the page Pr, exists means that the cache data is not dirty data. Assume here that the actual data, which is in a replication relationship with the cache data of the page Pr, exists on the pace Ppc in low-storage 12. In this case, it should be noted that it is not necessary to copy the cache data of the page Pr to low-speed storage 12 (so-called cache synchronization).

Therefore, cache controller 205 prevents the cache data of the page Pr from being copied to low-speed storage 12. Further, cache controller 205 releases the replication relationship, determined in step S64, in the same way as in step S42 associated with the above-mentioned I/O processing (step S66), and then proceeds to step S67.

In step S67, cache controller 205 deletes (releases) the page Pr from the cache area of high-speed storage 11, and changes the page Pr to a data area. More specifically, cache controller 205 changes the cache flag in an entry of physical volume management table 135a corresponding to the page Pr from "Yes" to "No." Cache controller 205 also changes, to "N/A," all of the logical volume ID, LBA, replication-destination: :replication-source information, and access characteristics in the entry of physical volume management table 135a corresponding to the page Pr. As a result, the page Pr is released from the cache area, and changed to a free area usable as a data area. Cache controller 205 cooperates with tier management unit 204, and repeats the above-mentioned steps S63 to S67 for the N pages listed in step S62 (step S68).

As described above, in the embodiment, cache controller 205 preferentially releases cache areas (pages) of smaller access counts (steps S62 to S67). Namely, in the embodiment, the cache areas storing data with a low possibility of being transferred to the upper tier (i.e., the cache areas storing data whose storage destination should not be changed to the upper tier) is preferentially released. This suppresses data transfers from the lower tier to the upper tier.

Further, in the embodiment, if a to-be-released cache area (page) stores cache data that is not dirty (i.e., non-dirty data) (Yes in step S64), cache controller 205 prevents the cache data from being copied (transferred) to the lower tier. More specifically, if low-speed storage 12 contains actual data that is in a replication relationship with cache data in a to-be-released cache area, cache controller 205 executes step S66 instead of step S65, before releasing the cache area and changing the same to a data area (step S67). Namely, instead of transferring the non-dirty data in the to-be-released cache area to the lower tier, cache controller 205 dissolves the replication relationship between the non-dirty data and the actual data (step S66). Thus, a data transfer from the upper tier to the lower tier can be suppressed when the cache area is changed to the data area. Accordingly, when, for example, the number of accesses to a first cache area storing non-dirty data is equal to that of accesses to a second cache area storing dirty data, cache controller 205 should preferentially release the first cache area.

Figure 12:
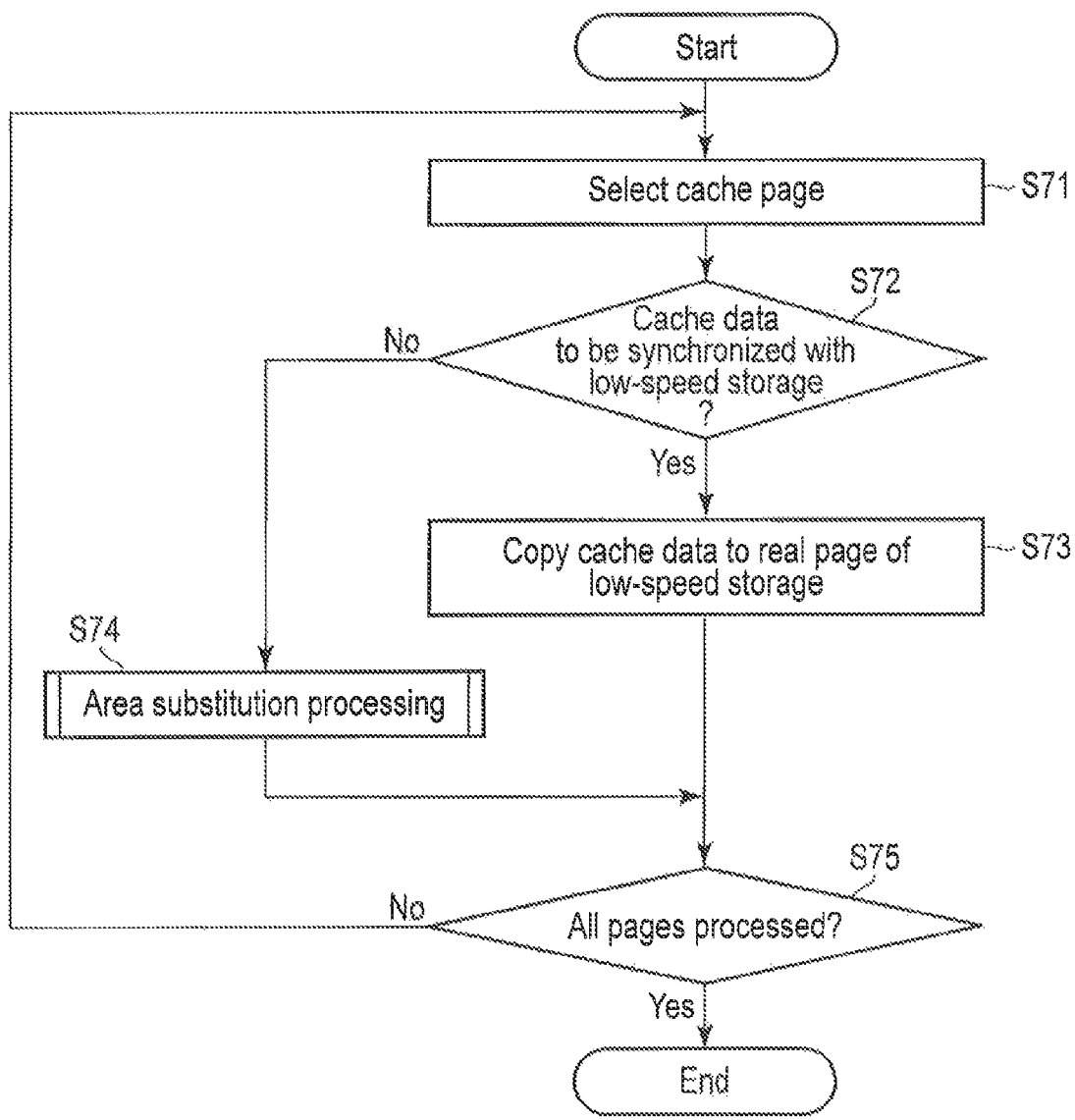
FIG. 12 is a flowchart showing an exemplary procedure of a cache synchronization processing in the embodiment.

Referring now to FIG. 12, a cache synchronization processing employed in the embodiment will be described. FIG. 12 is a flowchart showing an exemplary procedure of the cache synchronization processing. Cache controller 205 performs the cache synchronization processing upon receiving a cache synchronization request. The cache synchronization request is a command (i.e., a write request) for instructing cache controller 205 to write (copy or reflect) dirty data (i.e., cache data not reflected in the storage) to an area storing actual data corresponding to the dirty data, when the cache area stores the dirty data. The cache synchronization request is issued by an operating system (OS) when, for example, such an event as shutdown of the OS has occurred. The cache synchronization request is issued also when dirty data must be evicted from a cache area storing the dirty data in order to release the cache area. The cache synchronization request may also be issued in a predetermined schedule in storage controller 13.

Assume here that: cache controller 205 has received a cache synchronization request. In this case, cache controller 205 selects a dirty page (cache page) from high-speed storage 11 used as a cache, based on physical volume management table 135a (step S71). The dirty cache page means a page storing cache data not reflected in the storage (low-speed storage 12 in this example), i.e., dirty data.

Subsequently, cache controller 205 determines whether cache data (i.e., dirty data) stored in the selected cache page should be synchronized with low-speed storage 12 (step 372). Synchronization of cache data with low-speed storage 12 means that the cache data is copied as actual data to low-speed storage 12. This determination is performed, based on whether it is preferable to store the data of the selected cache page in low-speed storage 12. Specifically, cache controller 205 executes determination step S72, based on whether the access count of the selected cache page falls within a range not larger than the F-th count among all dirty cache pages in high-speed storage 11. Alternatively, cache controller 205 may execute determination step 372 based on whether the access count of the selected cache page is lower than a threshold.

If the determination in step 372 is Yes, cache controller 205 copies the data (cache data) of the selected cache page as actual data to low-speed storage 12 (step S73). In more detail, cache controller 205 replaces, with the data of the selected cache page, old actual data corresponding to the mentioned data and stored in low-speed storage 12. As a result, the cache data of the selected cache page is synchronized with low-speed storage 12.

In the embodiment, cache paces whose data is transferred from high-speed storage 11 (upper tier) to low-speed storage 12 (lower tier) in step S73 are limited to dirty cache pages having smaller access counts. In other words, in the embodiment, the cache pages whose data is transferred are limited to dirty cache pages whose cache data should preferably be placed in the lower tier. Accordingly, in the embodiment, retransfer of data to the upper tier after transfer of the data to the lower tier can be suppressed.

Assume here that cache data stored even in a dirty cache page whose cache data should preferably be placed in the upper tier is transferred from the upper tier to the lower tier, unlike the embodiment. In this case, the data once transferred to the lower tier will be retransferred to the upper tier. Namely, useless round trip of data will occur. The embodiment can prevent such useless round trip of data.

In contrast, if the determination in step S72 is No, cache controller 205 cache controller 205 executes an area substitution processing for changing the selected cache page (cache area) to a real page (data area) (step S74). The area substitution processing (step S74) in the cache synchronization processing is executed in the same way as the area substitution processing (step S9) in the tier changing processing.

In the embodiment, cache controller 205 classifies, as data that should not be synchronized, the cache data of a dirty cache page determined to be placed in high-speed storage 11 because it has a large access count (No in step S72). In this case, cache controller 205 performs, instead of cache synchronization, area conversion from the selected dirty cache page (cache area) to a real page (data area) (step S74). As a result, the content (actual data) of the real page to which the dirty cache page (cache area) is changed is identical to the content (cache data) of the dirty cache page. However, a cache page itself corresponding to the real page does not exist.

As described above, in the embodiment, if it is determined that the data of a selected dirty cache page should be placed in high-speed storage 11 (No in step S72), step S74 is executed to thereby provide an advantage equivalent to that of cache synchronization accompanied by a data transfer between tiers, with a data transfer between the tiers (more specifically, a data transfer from a cache page in high-speed storage 11 to a real page in low-speed storage 12) suppressed.

The above-described at least one embodiment can provide a tiered storage system, a storage controller, and a method of substituting a data transfer between tiers, which can maintain the input/output performance with data transfers between the tiers suppressed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage controller in a tiered storage system comprising a first storage device including a first physical volume, and a second storage device including a second physical volume, having a lower access speed than the first storage device, and having a greater storage capacity than the first storage device, the first and second physical volumes each comprising a set of storage areas having a certain size, the storage controller processing an input/output request from a host computer, the storage controller comprising:
a logical volume management unit which provides the host computer with a logical volume logically constructed using the first and second physical volumes;
a tier management unit which manages the first physical volume as a first tier and the second physical volume as a second tier lower than the first tier;
a cache controller which defines part of the set of storage areas of the first physical volume as a set of data areas for storing data, and which defines another part of the set of storage areas of the first physical volume as a set of cache areas for storing cache data, and which causes the set of cache areas to function as a cache for the tiered storage system; and
an input/output controller which writes data designated by a write request from the host computer to any one of a data area of the first physical volume and a storage area of the second physical volume, and which reads data designated by a read request from the host computer from any one of a data area of the first physical volume and a storage area of the second physical volume when the data designated by the read request is not in the cache, wherein:
the cache controller stores, as cache data, the read data in a cache area of the first physical volume when the read request designates a data read from the second physical volume;
the tier management unit determines storage areas storing data to be transferred from the second physical volume to the first physical volume, based on a descending order of access frequencies of the storage areas of the second physical volume;
the cache controller redefines, as a first data area, a first storage area of the first physical volume defined as a first cache area, instead of transferring first data stored in a second storage area of the second physical volume to the first physical volume, when the determined storage areas include the second storage area and when the first data is also stored as first cache data in the first cache area; and
the tier management unit transfers the first data to a free data area of the first physical volume when the determined storage areas include the second storage area and when the first data is not stored in the cache.

2. The storage controller of claim 1, wherein the cache controller
suppresses caching of the read data in a cache area of the first physical volume when the read request designates a data read from the first physical volume.

3. The storage controller of claim 1, wherein:
the cache controller selects storage areas corresponding to a first size from storage areas of the first physical volume defined as data areas, based on an ascending order of access frequencies of the storage areas of the first physical volume defined as the data areas, when a size of the cache is reduced from a target size by the first size; and
the cache controller redefines the selected storage areas as cache areas.

4. The storage controller of claim 1, wherein:
the cache controller selects storage areas corresponding to a second size from storage areas of the first physical volume defined as cache areas, based on an ascending order of access frequencies of the storage areas of the first physical volume defined as the cache areas, when the first physical volume is short of data areas corresponding to the second size; and
the cache controller redefines the selected storage areas as data areas.

5. The storage controller of claim 1, wherein:
the cache controller
selects a second cache area which newly stores third data as third cache data in accordance with a write request from the host computer after storing, as second cache data, second data read from the second physical volume, when a cache synchronization request is received, the cache synchronization request being a request of cache synchronization of copying data stored in a cache area to the second physical volume;
the cache controller determines whether the cache synchronization is needed, based on an access frequency of a third storage area defined as the selected second cache area;
the cache controller replaces the second data in the second physical volume with the third data when the cache synchronization is needed; and
the cache controller redefines the third storage area as a data area when the cache synchronization is not needed.

6. A tiered storage system comprising:
a first storage device including a first physical volume;
a second storage device including a second physical volume, having a lower access speed than the first storage device, and having a greater storage capacity than the first storage device; and
a storage controller which processes an input/output request from a host computer,
wherein:
the first and second physical volumes each comprise a set of storage areas having a certain size; and
the storage controller comprises
a logical volume management unit which provides the host computer with a logical volume logically constructed using the first and second physical volumes;
a tier management unit which manages the first physical volume as a first tier and the second physical volume as a second tier lower than the first tier;
a cache controller which defines part of the set of storage areas of the first physical volume as a set of data areas for storing data, and which defines another part of the set of storage areas of the first physical volume as a set of cache areas for storing cache data, and which causes the set of cache areas to function as a cache for the tiered storage system; and
an input/output controller which writes data designated by a write request from the host computer to any one of a data area of the first physical volume and a storage area of the second physical volume, and which reads data designated by a read request from the host computer from any one of a data area of the first physical volume and a storage area of the second physical volume when the data designated by the read request is not in the cache,
wherein:
the cache controller stores, as cache data, the read data in a cache area of the first physical volume when the read request designates a data read from the second physical volume;
the tier management unit determines storage areas storing data to be transferred from the second physical volume to the first physical volume, based on a descending order of access frequencies of the storage areas of the second physical volume;
the cache controller redefines, as a first data area, a first storage area of the first physical volume defined as a first cache area, instead of transferring first data stored in a second storage area of the second physical volume to the first physical volume, when the determined storage areas include the second storage area and when the first data is also stored as first cache data in the first cache area; and
the tier management unit transfers the first data to a free data area of the first physical volume when the determined storage areas include the second storage area and when the first data is not stored in the cache.

7. The tiered storage system of claim 6, wherein the cache controller
suppresses caching of the read data in a cache area of the first physical volume when the read request designates a data read from the first physical volume.

8. The tiered storage system of claim 6, wherein:
the cache controller selects storage areas corresponding to a first size from storage areas of the first physical volume defined as data areas, based on an ascending order of access frequencies of the storage areas of the first physical volume defined as the data areas, when a size of the cache is reduced from a target size by the first size; and the cache controller redefines the selected storage areas as cache areas.

9. The tiered storage system of claim 6, wherein;

the cache controller selects storage areas corresponding to a second size from storage areas of the first physical volume defined as cache areas, based on an ascending order of access frequencies of the storage areas of the first physical volume defined as the cache areas, when the first physical volume is short of data areas corresponding to the second size; and the cache controller redefines the selected storage areas as data areas.

10. The tiered storage system of claim 6, wherein:

the cache controller selects a second cache area which newly stores third data as third cache data in accordance with a write request from the host computer after storing, as second cache data, second data read from the second physical volume, when a cache synchronization request is received, the cache synchronization request being a request of cache synchronization of copying data stored in a cache area to the second physical volume;

the cache controller determines whether the cache synchronization is needed, based on an access frequency of a third storage area defined as the selected second cache area;

the cache controller replaces the second data in the second physical volume with the third data when the cache synchronization is needed; and the cache controller redefines the third storage area as a data area when the cache synchronization is not needed.

11. A method of substituting a data transfer between tiers, implemented on a storage controller which processes an input/output request from a host computer, the storage controller being included in a tiered storage system that comprises a first storage device including a first physical volume, and a second storage device including a second physical volume, having a lower access speed than the first storage device, and having a greater storage capacity than the first storage device, the first and second physical volumes each comprising a set of storage areas having a certain size, the storage controller providing the host computer with a logical volume logically constructed using the first and second physical volumes, and managing the first physical volume as a first tier and the second physical volume as a second tier lower than the first tier, the method comprising:

defining part of the set of storage areas of the first physical volume as a set of data areas for storing data;

defining another part of the set of storage areas of the first physical volume as a set of cache areas for storing cache data;

causing the set of cache areas to function as a cache for the tiered storage system;

writing data designated by a write request from the host computer to any one of a data area of the first physical volume and a storage area of the second physical volume;

reading data designated by a read request from the host computer from any one of a data area of the first physical volume and a storage area of the second physical volume when the data designated by the read request is not in the cache;

storing, as cache data, the read data in a cache area of the first physical volume when the read request designates a data read from the second physical volume;

determining storage areas storing data to be transferred from the second physical volume to the first physical volume, based on a descending order of access frequencies of the storage areas of the second physical volume; and redefining, as a first data area, a first storage area of the first physical volume defined as a first cache area, instead of transferring first data stored in a second storage area of the second physical volume to the first physical volume, when the determined storage areas include the second storage area and when the first data is also stored as first cache data in the first cache area; and transferring the first data to a free data area of the first physical volume when the determined storage areas include the second storage area and when the first data is not stored in the cache.

12. The method of claim 11, further comprising suppressing caching of the read data in a cache area of the first physical volume when the read request designates a data read from the first physical volume.

13. The method of claim 11, further comprising:

selecting storage areas corresponding to a first size from storage areas of the first physical volume defined as data areas, based on an ascending order of access frequencies of the storage areas of the first physical volume defined as the data areas, when a size of the cache is reduced from a target size by the first size; and redefining the selected storage areas as cache areas.

14. The method of claim 11, further comprising:

selecting a second cache area which newly stores third data as third cache data in accordance with a write request from the host computer after storing, as second cache data, second data read from the second physical volume, when a cache synchronization request is received, the cache synchronization request being a request of cache synchronization of copying data stored in a cache area to the second physical volume;

determining whether the cache synchronization is needed, based on an access frequency of a third storage area defined as the selected second cache area;

replacing the second data in the second physical volume with the third data when the cache synchronization is needed; and redefining the third storage area as a data area when the cache synchronization is not needed.

15. The method of claim 11, further comprising:

selecting storage areas corresponding to a second size from storage areas of the first physical volume defined as cache areas, based on an ascending order of access frequencies of the storage areas of the first physical volume defined as the cache areas, when the first physical volume is short of data areas corresponding to the second size; and redefining the selected storage areas as data areas.

* * * * *